(12) United States Patent
Prakriya et al.

(10) Patent No.: US 6,801,200 B1
(45) Date of Patent: *Oct. 5, 2004

(54) LAYOUT OF DATA STRUCTURES BASED ON RELATIONSHIPS BETWEEN THE DATA STRUCTURES

(75) Inventors: Mahesh Prakriya, Redmond, WA (US); Xiaoning Ling, Bellevue, WA (US); Shoshanna K. Budzianowski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/717,644

(22) Filed: Nov. 21, 2000

Related U.S. Application Data

(63) Continuation of application No. 09/175,833, filed on Oct. 19, 1998, now Pat. No. 6,154,220.

(51) Int. Cl.$^7$ .................................................. G06T 1/11
(52) U.S. Cl. ......................................................... 345/440
(58) Field of Search ................................. 345/659, 619, 345/735, 778, 788, 789, 440; 707/201

(56) References Cited

U.S. PATENT DOCUMENTS

| | | | |
|---|---|---|---|
| 5,321,816 A | 6/1994 | Rogan | ......................... 395/200 |
| 5,684,807 A | 11/1997 | Bianchini, Jr. | .............. 371/20.1 |

(List continued on next page.)

OTHER PUBLICATIONS

J.W. Thomas, Numerical Partial Differential Equations, 1995, Springer, pp. 148–203.*

(List continued on next page.)

Primary Examiner—Jeffery Brier
Assistant Examiner—Javid Amini
(74) Attorney, Agent, or Firm—Woodcock Washburn LLP

(57) ABSTRACT

A rectilinear layout system creates a diagram (graph) from information about items (nodes) and relationships among the items, such as the information which defines data bases, computer networks, and object based systems. The rectilinear layout system designates one of the items as a focus node and partitions the remaining items into clusters (sub-graphs) of related nodes. Multiple location groups are created that are relative to the focus node for the graph and each sub-graph is assigned to a location group. The rectilinear layout system then plots a location for each node in each of the sub-graphs by recursively iterating through the sub-graphs, designating focus nodes for each sub-graph, creating lower level sub-graphs, and assigning the lower level sub-graphs to location groups relative to the corresponding focus node until a lower level sub-graph contains only a single node. At that point, the rectilinear layout system plots the single node on to a layout surface for the lower level sub-graph and returns up a level. Once all nodes in a sub-graph have been plotted, the rectilinear layout system routes connectors among the nodes to represent the relationship among the nodes. The rectilinear layout system continues its recursive functions until all sub-graphs have been laid out. The rectilinear layout system then plots absolute coordinates for the focus node for the graph, the nodes of the sub-graphs, and the connectors within the sub-graphs, and creates connectors among the focus node for the graph and the appropriate nodes of the sub-graphs. Data structures for managing the information at each sub-graph level are also described as is a particular arrangement of computer software modules for implementing the rectilinear layout system.

32 Claims, 14 Drawing Sheets

U.S. PATENT DOCUMENTS

| | | | | |
|---|---|---|---|---|
| 5,808,615 A | * | 9/1998 | Hill et al. | 707/201 |
| 6,014,669 A | | 1/2000 | Slaughter | 707/10 |
| 6,028,602 A | | 2/2000 | Weidenfeller | 345/356 |
| 6,040,834 A | | 3/2000 | Jain | 345/356 |
| 6,154,220 A | * | 11/2000 | Prakriya et al. | 345/440 |
| 6,285,367 B1 | * | 9/2001 | Abrams et al. | 345/841 |
| 2001/0049695 A1 | * | 12/2001 | Chi et al. | 345/440 |

OTHER PUBLICATIONS

"ERwin, Your database is the foundation of your business. ERwin makes database design easy", http://www.platinum.com/products/brochure/als/b_erwin.htm, Platinum Technology, pp. 1–6, (1995).

"Feature Overview", http://ww.visio.com/products/professional/overview/main_cont.html, Visio Corporation, p. 1, (1997).

"Graph Layout Toolkit", http://www.tomsawyer.com/glt/index.html, Tom Sawyer Software, pp. 1–3.

* cited by examiner

LAYOUT OF DATA STRUCTURES BASED ON RELATIONSHIPS BETWEEN THE DATA STRUCTURES This is a continuation of U.S. patent application Ser. No. 09/175,833, filed Oct. 19, 1998, now U.S. Pat. No. 6,154,220 which application is incorporated herein by reference.

FIELD OF THE INVENTION

This invention relates generally to data structures, and more particularly to visual representations of relationships among data structures.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1997, Microsoft Corporation, All Rights Reserved.

BACKGROUND OF THE INVENTION

Diagrams are frequently used to enable human beings to comprehend complex relationships between items, such as data base records or computer programming objects. The relationships are usually visually represented as lines (connectors) drawn between nodes that represent the items. When a diagram is small (approximately 10 nodes or less), a user can easily arrange the diagram by hand to be readable. However, larger diagrams make hand-placement of nodes a tedious, non-trivial, time-consuming task. Although diagrams are most valuable when dealing with hundreds of nodes and hundreds of connectors, the value is severely diminished when the user has to manipulate the nodes and connectors to make the diagram understandable.

Therefore, there have been many attempts to develop a computer application that lays out diagrams in a way that is both quick and very easy to read. However, all of the currently available applications fail to entirely address the problem from both the standpoints of speed and resulting readability.

For example, using seventy-two nodes and over one hundred connectors, Vision® by Visio Corp. requires approximately thirty seconds to create a diagram, related nodes are not clustered together, and the nodes are so densely packed together that the resulting diagram is not easily readable by a human being. Erwin™ by LogicWorks, Inc. lays out the same number of nodes and connectors in approximately ten seconds, but also does not cluster related nodes. Graphing software from Tom Sawyer Software is faster than Erwin™ but outputs a diagram that is also difficult to read because related nodes are not clustered and because the nodes are dispersed over a wide area, making the connectors excessively long.

Therefore, the need for a layout application that creates a node and connector diagram that is easily understood and quickly created.

SUMMARY OF THE INVENTION

The above-mentioned shortcomings, disadvantages and problems are addressed by the present invention, which will be understood by reading and studying the following specification.

A rectilinear layout system creates a diagram (graph) from information about items (nodes) and relationships among the items, such as the information which defines data bases, computer networks, and object based systems. The rectilinear layout system designates one of the items as a focus node and partitions the remaining items into clusters (sub-graphs) of related nodes. Multiple location groups are created that are relative to the focus node for the graph and each sub-graph is assigned to a location group. The rectilinear layout system then plots a location for each node in each of the sub-graphs by recursively iterating through the sub-graphs, designating a focus node for each sub-graph, creating lower level sub-graphs, and assigning the lower level sub-graphs to location groups relative to the corresponding focus node until a lower level sub-graph contains only a single node. At that point, the rectilinear layout system plots the single node on to a layout surface for the lower level sub-graph and returns up a level. Once all nodes in a sub-graph have been plotted, the rectilinear layout system routes connectors among the nodes to represent the relationship among the nodes. The rectilinear layout system continues its recursive functions until all sub-graphs have been laid out. The rectilinear layout system then plots absolute coordinates for the focus node for the graph, the nodes of the sub-graphs, and the connectors within the sub-graphs, and creates connectors among the focus node for the graph and the appropriate nodes of the sub-graphs.

In one aspect of the invention, the item with the most relationships is designated as the focus node, with the size of the node used to represent the item in the graph used as a tie-breaker. The style of the graph is dependent on which of the different location groups are used and the order in which sub-graphs are assigned to them. Potential connector routes for previously plotted nodes are also taken into account when assigning a sub-graph to a location group. Data structures used to manage the nodes and connectors at various levels of sub-graphs are also described.

In a further aspect of the invention, eight software modules are described which implement the rectilinear layout system in the Microsoft Database Designer system.

The rectilinear layout system addresses the problem of readability of a complex diagram by selecting the focus nodes for the various levels based on the maximum number of nodal relationships, thereby clustering related nodes together. Positioning the focus nodes at the center of the corresponding layout surface makes the related nodes easier to locate and the connections among the nodes easier to navigate.

The rectilinear layout system also addresses the performance issues common in other graphing solutions. The rectilinear layout system employs a unique two-block procedure to position a node or a sub-graph around its focus without costly backtracking, i.e., making two passes through the information defining the nodes and relationships, and in the second pass repositions the nodes that have been already positioned in the first pass. The first block of the rectilinear layout system recursively partitions the graph and valid candidate locations for the node/sub-graph are calculated. In the second block of the rectilinear layout system, the graph is recursively constructed by calculating the actual x-y coordinates for the node/sub-graph on the valid locations.

Furthermore, performance is improved because connector routing is completely localized at each sub-graph level since there is no connection between two non-focus nodes at different sub-graph levels. This makes it possible to eliminate line crossing at each sub-graph level without having to re-route connectors that have already been routed, thus avoiding the costly routing backtracking present in other systems.

As a result, the graphs produced by the rectilinear layout system have several beneficial characteristics. A graph contains one or more clusters of nodes in which the nodes are usually grouped closer relative to each other than nodes in different clusters, thus visually indicating their close relationships and correlating the relationships with the nodes. The benefits of this characteristic are most obvious when dealing with complex diagrams as the relationships in such diagrams are much clearer when laid out with the rectilinear layout system. Each cluster in a graph contains one focus node with distinct syntactic or semantic features and the clusters are positioned in such a way that they can be easily located and navigated by a human being. Finally, nodes and sub-graphs within a cluster can be positioned symmetrically around the focus node, which aids in the understanding of the connectivity within clusters.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention as part of Microsoft Database Designer is described. Finally, in the fifth section, a conclusion of the detailed description is provided.

Hardware and Operating Environment

Figure 1:
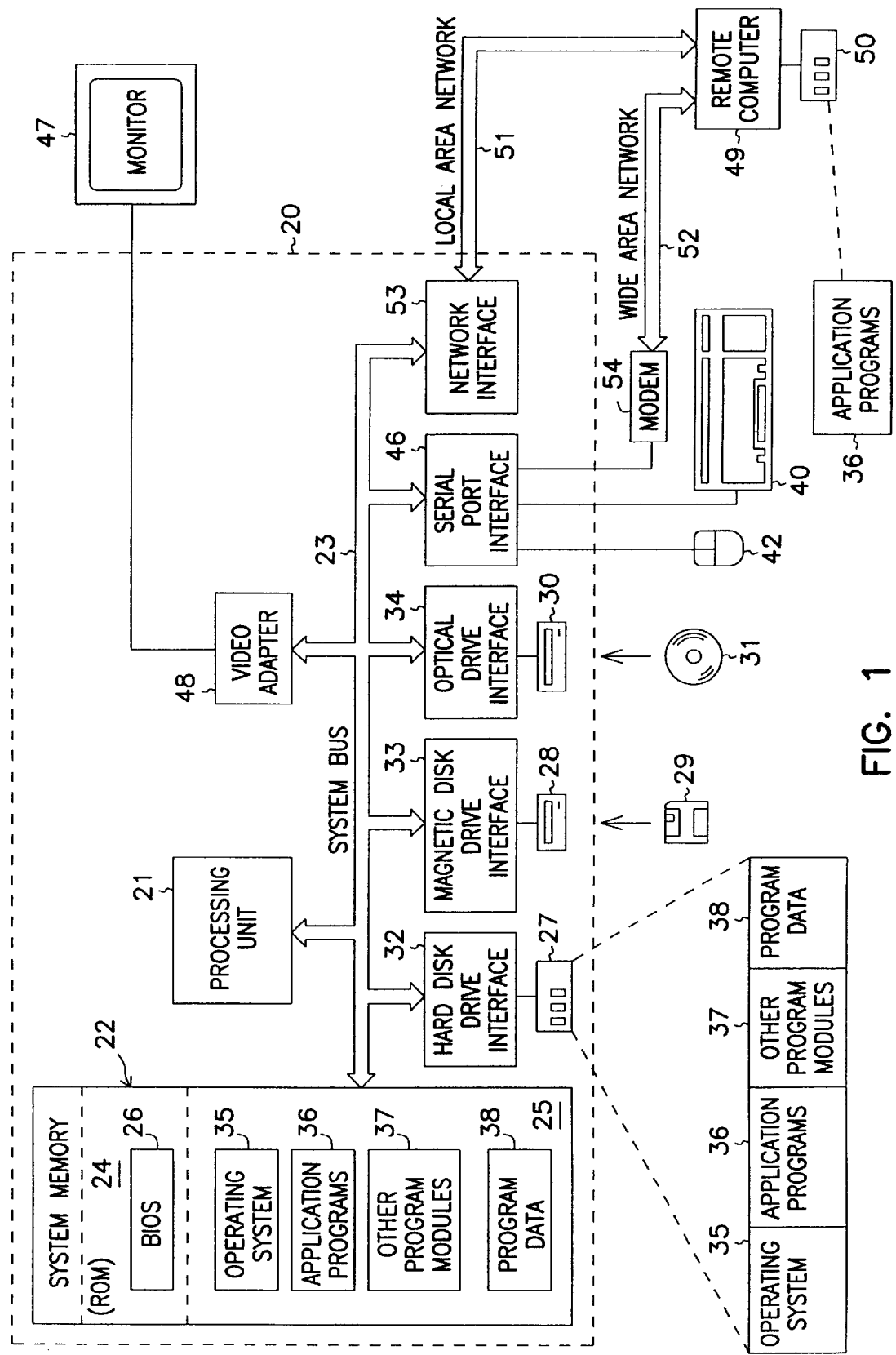
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25 a basic input/output system (BIOS) 26, containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIGS. 2–7B.

A rectilinear layout system is described in terms of computer software executing in the processing unit of a computer such as computer 20 or remote computer 49 in FIG. 1. The rectilinear layout system obtains information regarding items and relationships among the items from a computer-readable medium such as hard disk drive 27. The rectilinear layout system 200 shown in an exemplary embodiment in FIG. 2, obtains the information from a data base schema 201 and manipulates nodes that represent data base records and connectors that represent the relationships between the data base records to create diagrams for output on a display device 202 such as monitor 47. The invention is not limited to creating diagrams for data bases, and alternate output devices, such as printers and plotters, are equally applicable as will be readily apparent to one skilled in the art when reading the following description.

Figure 3:
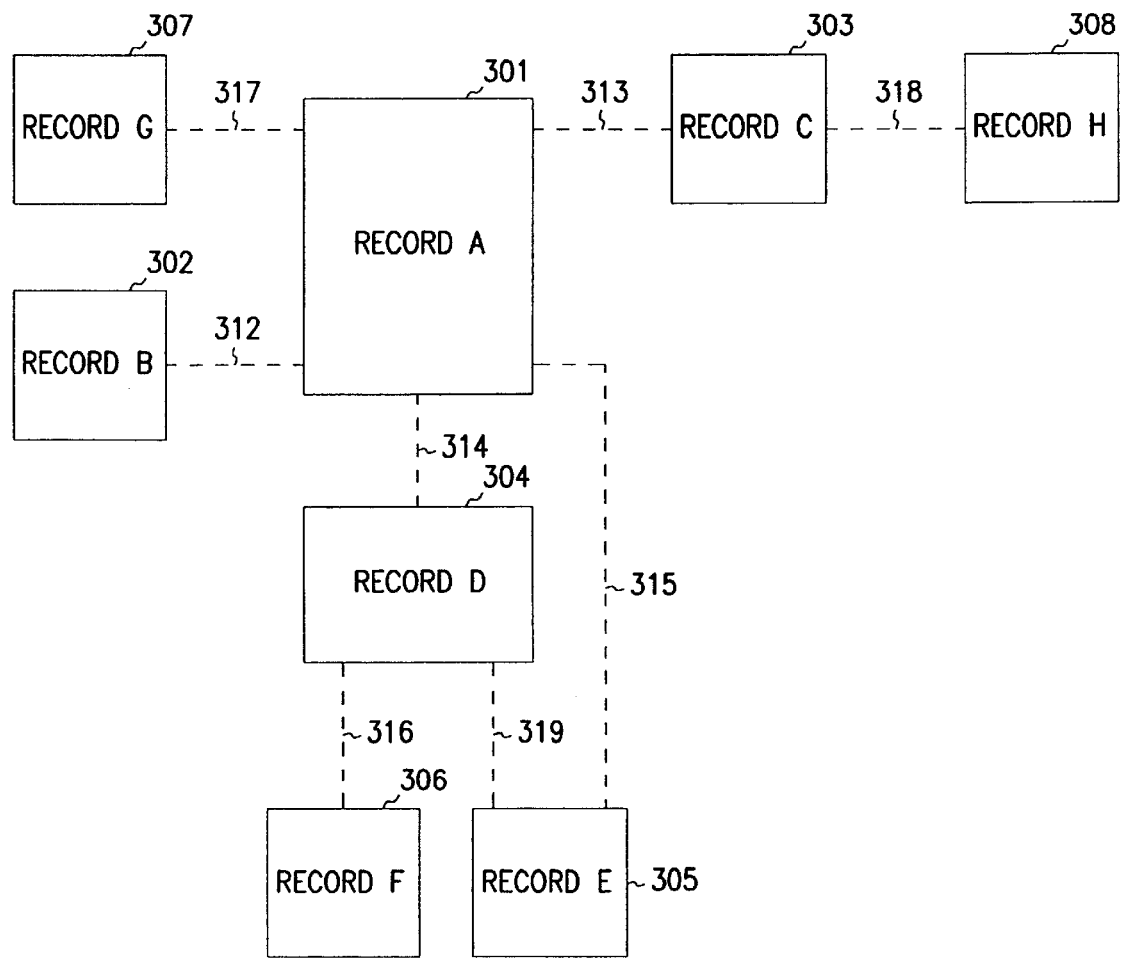
FIG. 3 is a diagram illustrating items and relationships to be placed in a graph by the exemplary embodiment of the invention of FIG. 3.

In the present example, the data base schema 201 contains information about eight data base records A, B, C, D, E, F, G, H and their interrelationships. Each record is associated in the data base schema 201 with a node that is proportional in size to the amount of information contained in the corresponding record. The data base records A–H are illustrated in FIG. 3 as rectangular nodes 301, 302, 303, 304, 305, 306, 307 and 308, and the logical relationships among the records A–H are represented by dashed lines 312, 313, 314, 315, 316, 317, 318 and 319. After reading the data base schema 201, the rectilinear layout system 200 determines which of the records A–H has the most relationships, i.e., will have the most connectors to the nodes representing the other records in the final diagram ("graph"), and designates the record and the node for that record as the focus or "center node" for the graph. In the present example, the node 301 for record A is designated as the focus node.

Figure 4:
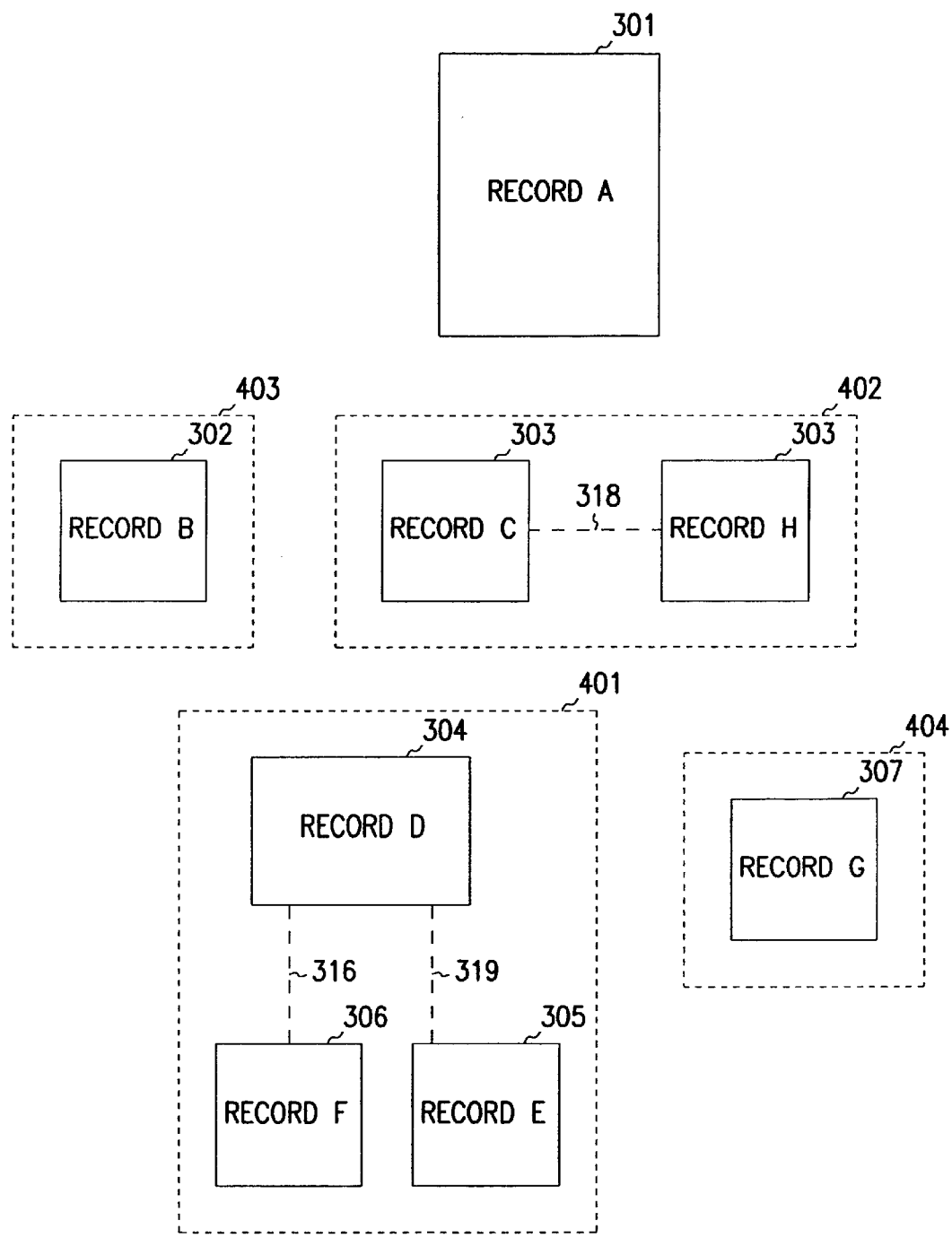
FIG. 4 is a diagram illustrating sub-graphs created by the exemplary embodiment of the invention from the items and relationships of FIG. 3.

The rectilinear layout system 200 logically "decomposes" the relationships 312, 313, 314, 315, 317 between the focus record A and the records B, C, D and E to create four sub-graphs 401, 402, 403, 404 as shown in FIG. 4. The sub-graphs are sorted in descending order based on the size of each sub-graph, i.e., the relative amount of space the sub-graph will require in the graph, which is determined by the size of the nodes used to represent the records in the sub-graph Sub-graph 401 is the "biggest" sub-graph in the present example, followed by sub-graph 402. Sub-graphs 403 and 404 are equal in size and so are sorted in a randomly order after sub-graph 402. Alternate embodiments in which the sub-graphs are sorted on different common characteristics or left unsorted will be readily apparent to one skilled in the art and are within the scope of the invention.

Figure 5:
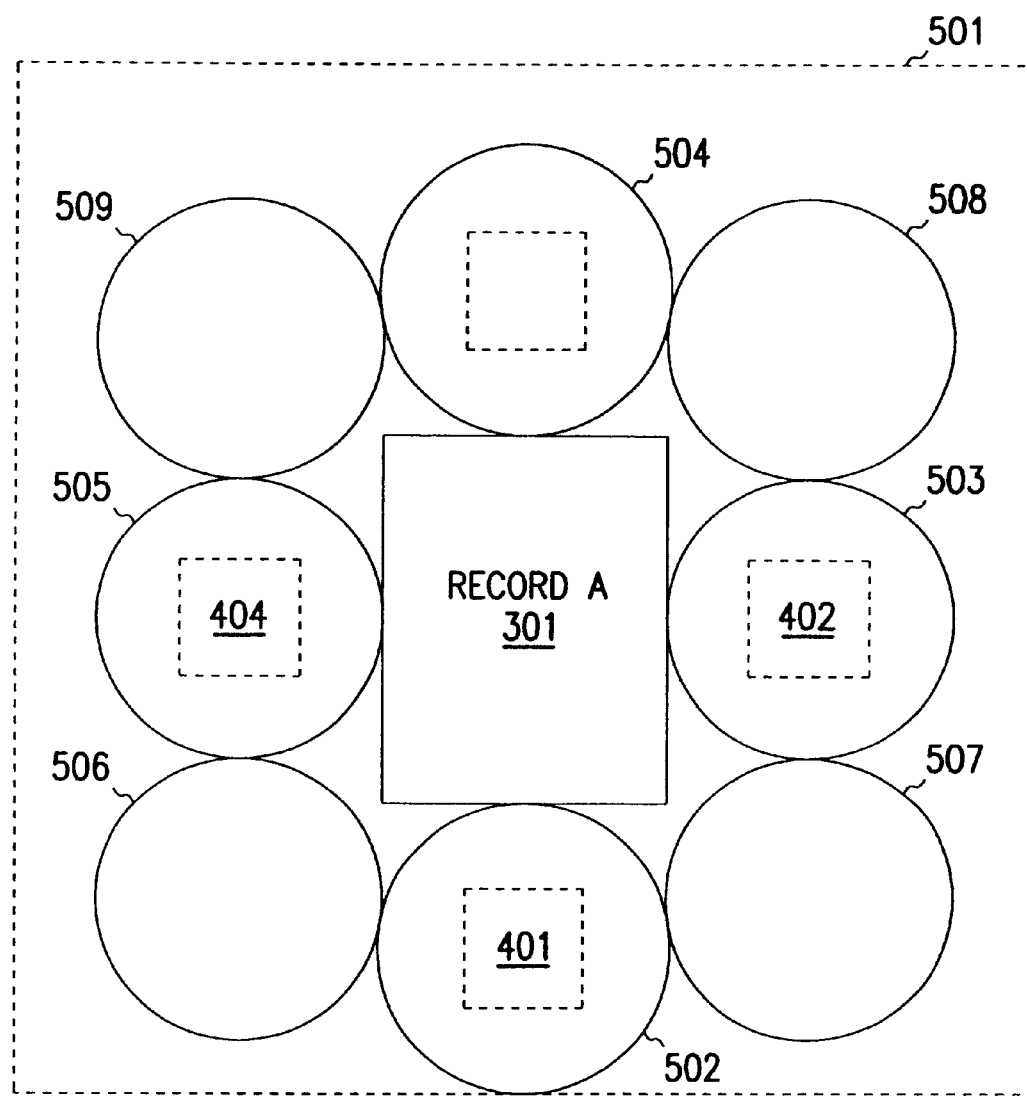
FIG. 5 is a diagram illustrating a layout surface for the graph of FIG. 3.

Referring now to FIG. 5, a logical area ("layout surface") 501 is created having focus node 301 at its center. The layout surface 501 is partitioned into eight regions or "location groups" 502, 503, 504, 505, 506, 507, 508, 509 represented as circles in FIG. 5. It is important to note that, at this point, the rectilinear layout system 200 does not assign precise coordinates in the graph to the location groups 502–509 but instead approximately positions the location groups around the focus record 301. As shown in FIG. 5, location group 501 is positioned at the bottom of focus record 301, location group 502 is left, and location group 507 is bottom-right.

The rectilinear layout system 200 uses a two-block process to assign a sub-graph to a location group around the focus node. The first block is to find valid location groups for the sub-graphs based on any previously established node locations and/or potential connector routes as is explained in more detail below in conjunction with FIG. 6A. The second block is to determine which valid location group should be used for each sub-graph based on a specified layout style as explained in the next section. In the exemplary embodiment, the layout surface 501 is the top layout surface, so no node locations have been established and all potential connector routes are open. The layout style for the exemplary embodiment uses the four location groups 502, 503, 504, 505 in the layout surface 501 and alternates between assigning a top/bottom location group with a side location group to create a layout that is balanced horizontally and vertically. Therefore, the rectilinear layout system 200 logically assigns the first sub-graph in sorted order, sub-graph 401, to location group 502, the next sub-graph, sub-graph 402 to location group 503, and the final two sub-graphs, sub-graphs 403 and 404, to location groups 504 and 505 respectively.

Figure 6A:
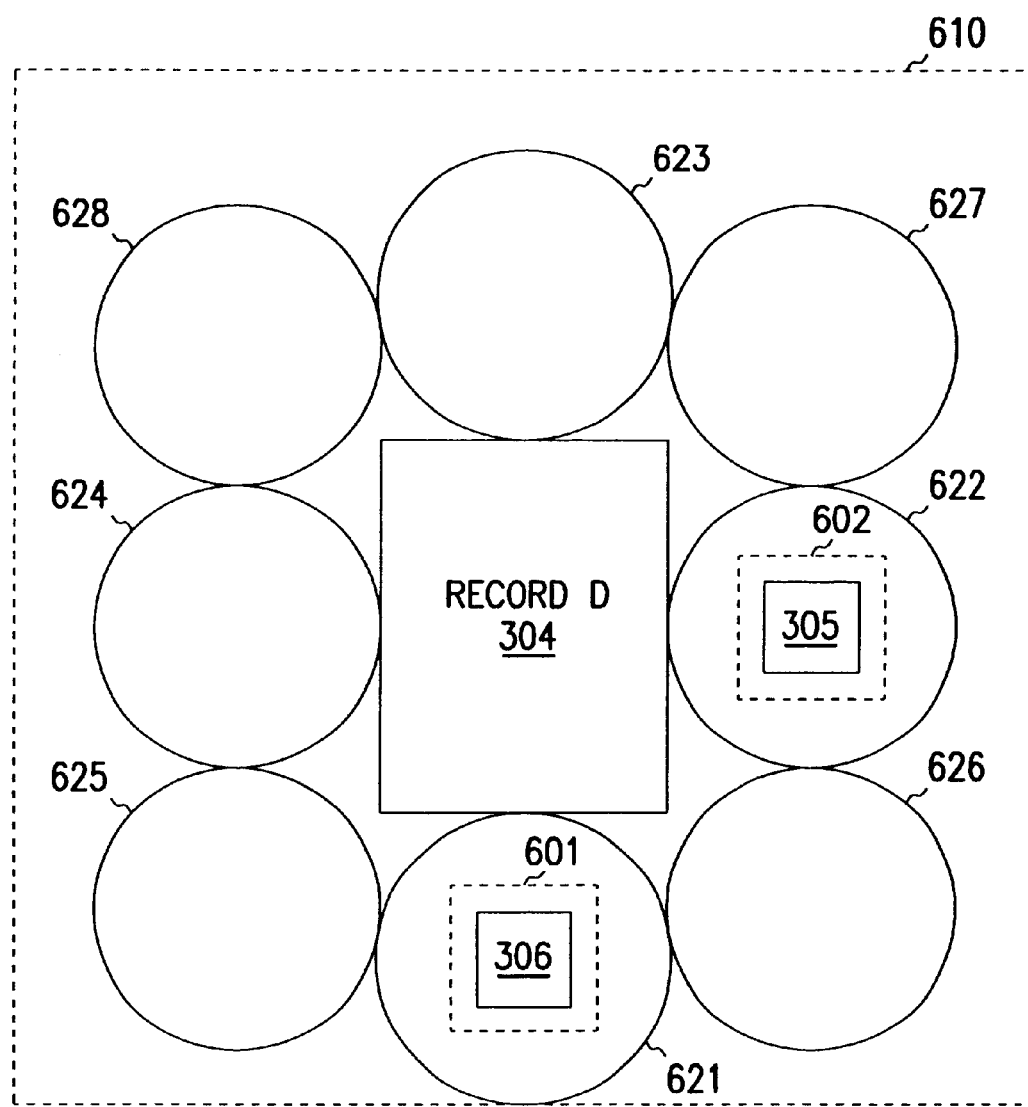
FIGS. 6A, 6B, 6C, 6D and 6E are diagrams illustrating layout surfaces for the sub-graphs of FIG. 4.
Figure 6B:
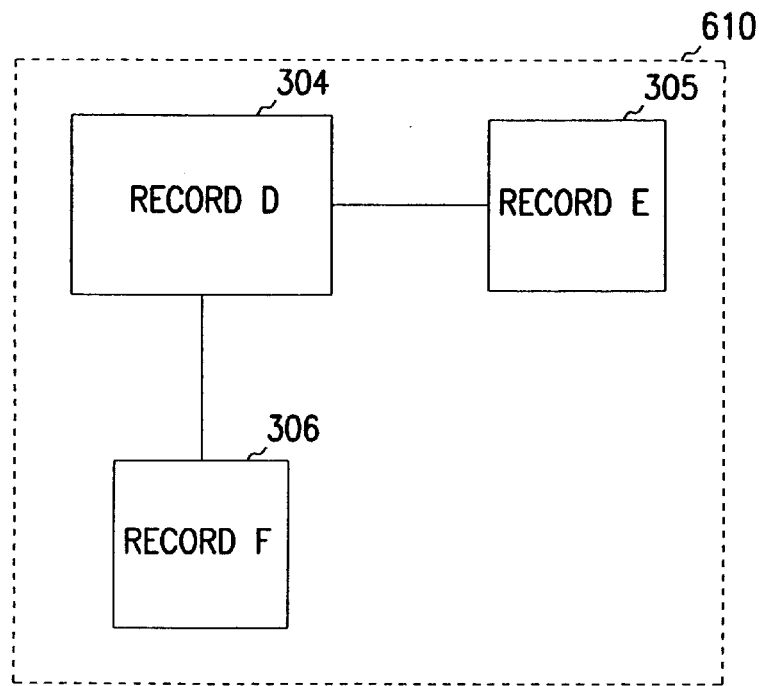

Once the sub-graphs have been assigned to location groups, the rectilinear layout system 200 determines the layout and routing of connectors for each sub-graph as shown in FIGS. 6A–B for sub-graph 401. The rectilinear layout system 200 determines a focus or center node for each sub-graph as described above. In the case of sub-graph 401, the node 304 for record D is designated as the focus. The rectilinear layout system 200 then decomposes the records F and E into sub-graphs 601 and 602 respectively. The focus node 304 is placed in the center of a layout surface 610 and the eight location groups positioned around the focus node 304.

The location group assignments for sub-graphs 601, 622 are determined using the two block process described briefly above. In the first block, valid location groups are chosen based on previously established node locations and potential connector routes. In the present example, there will be a connector routed between the focus node 304 of sub-graph 401 and the focus node 301 in the layout surface 501 when the graph is complete. Since sub-graph 401 was assigned to location group 502 at the bottom of the layout surface 501, the location group 623 at the top of layout surface 610 is not a valid location group for sub-graphs 601, 602 because their nodes would interfere with the routing of the connector between nodes 304 and 301. Similarly, because there will be a connector between node 305 in sub-group 602 and focus node 301, the location group 621 at the bottom of the layout surface 610 is not a valid location group for sub-graph 602. Therefore, location groups 621, 622, 624 are valid for sub-graph 601, and location groups 622, 624 are valid for sub-graph 602.

In the second block, the layout style of the graph is factored into the determination. In order to balance the graph vertically and horizontally, sub-graph 601 is assigned to location group 621, and sub-graph 602 is assigned to location group 622.

The rectilinear layout system 200 examines sub-graph 601 in location group 621 and determines that only node 306 is present in the sub-graph 601. At this point, the rectilinear layout system 200 determines the dimensions of the layout surface for sub-graph 601 based on the node 304. The rectilinear layout system 200 does the same for the layout surface for sub-group 602.

Because the dimensions for the layout surfaces for sub-groups 601 and 602 are now known, the rectilinear layout system 200 can calculate coordinates for the positions of the sub-groups 601 and 602 on the layout surface 610. The coordinates for sub-group 601 are calculated to center the node 304 relative to, and to avoid overlap with, the focus node 306. Similarly, the coordinates of the sub-group 602 are calculated to avoid overlap with the focus node 304 and the sub-group 601. Different layout style information can also be incorporated into the coordinate calculation as described in more detail in the next section.

When the rectilinear layout system 200 has laid out the sub-graphs 601 and 602 on the layout surface 610, the coordinates of all the nodes 304–306 are known. The rectilinear layout system 200 now routes connectors between the nodes 304–306 to represent the relationships among the records D, E and F, as shown in FIG. 6B, and so that there is no overlap between connectors or with nodes as described further below. The nodes and connectors define the dimensions of the layout surface 610.

Figure 6C:
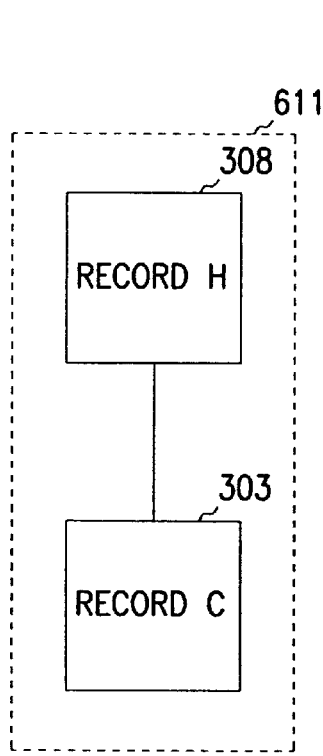
Figure 6D:
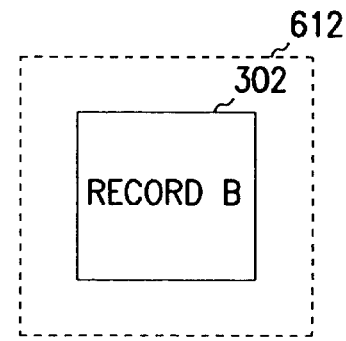
Figure 6E:
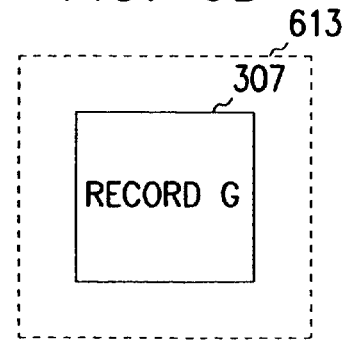

One of skill in the art will immediately perceive that the rectilinear layout system 200 recursively proceeds "downward" through successive layout surfaces, determining a focus node for each layout surface, decomposing relationships, and creating additional lower level layout surfaces until it reaches a sub-graph containing a single node. At that point, the dimensions of the current layout surface are known because the dimensions of the node are known. Once dimensions for all sub-graphs in the current layout surface are known, the rectilinear layout system 200 plots the position of each sub-group on the layout surface which assigns coordinates to the nodes in the sub-group. The rectilinear layout system 200 routes connectors between the appropriate nodes in the sub-groups to complete the layout surface. The rectilinear layout system 200 then proceeds up a level to the immediately "higher" layout surface. Thus, the recursive process results in a layout surface 611 for sub-graph 402 having the nodes 308 and 303 for records C and H as shown in FIG. 6C, and the layout surfaces 612 and 613 for sub-graphs 403 and 404 having the nodes 302 and 307 for records B and G as shown in FIGS. 6D and 6E respectively.

If more than one sub-graph is assigned to the same location group, the rectilinear layout system 200 processes the sub-graphs in order of size, i.e., as they were sorted during the decomposition stage and lays out the sub-graphs on a layout surface associated with the location group. When laying out multiple sub-graphs in a location group, the rectilinear layout system 200 avoids overlapping node locations and connector routes already established within the location group with new nodes and connectors. For example, if a left location group contains two sub-graphs, one is positioned vertically "above" the other in the layout surface for the location group because positioning one horizontally to the left of the other would block a potential connector route. As will be readily apparent to one of skill in the art, when only one sub-graph is assigned to a location group, the layout surface for the location group is the same as the layout surface of the sub-graph.

Figure 7A:
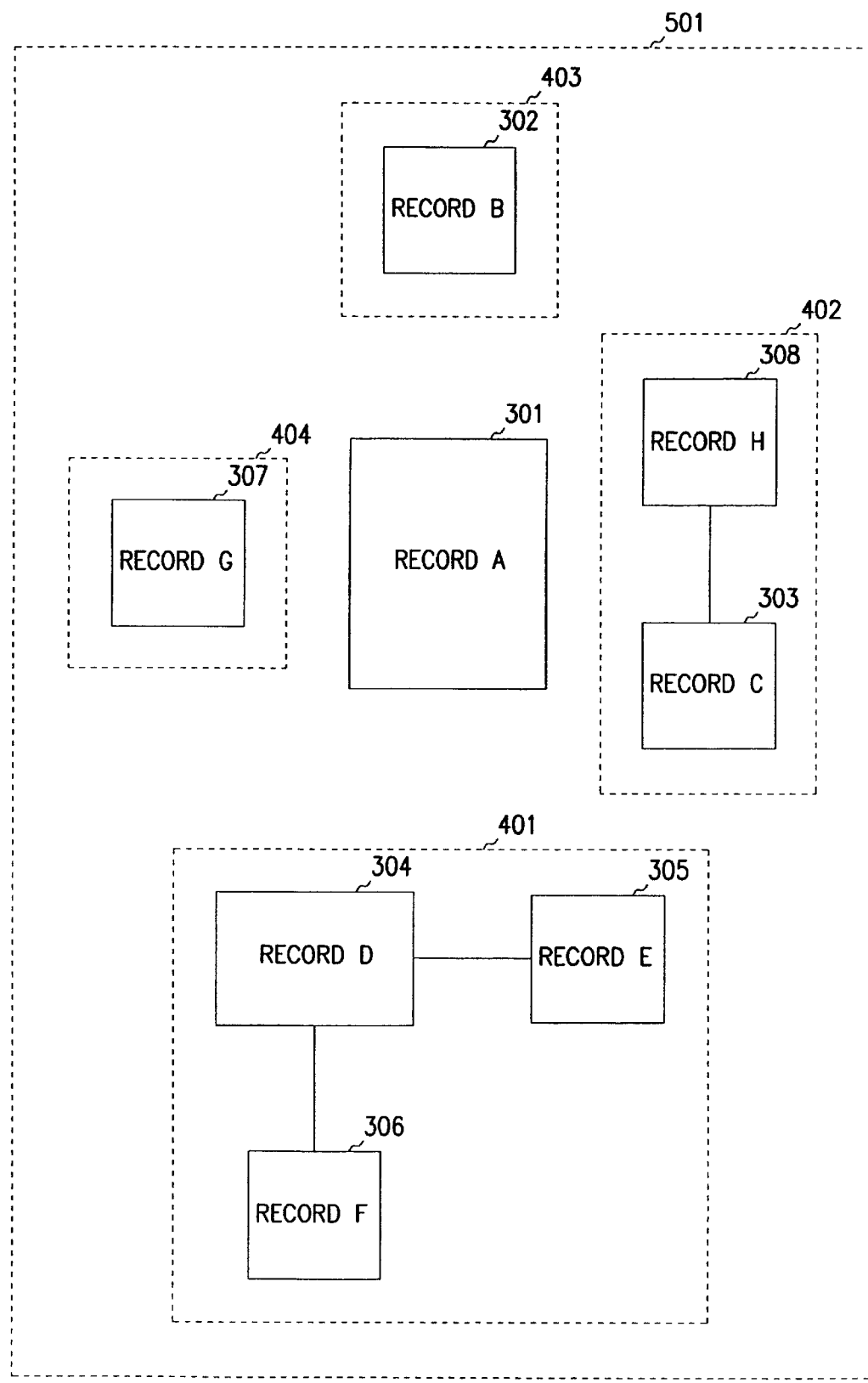
FIGS. 7A and 7B are diagrams illustrating the placement of sub-graphs and the routing of connectors for the graph.
Figure 7B:
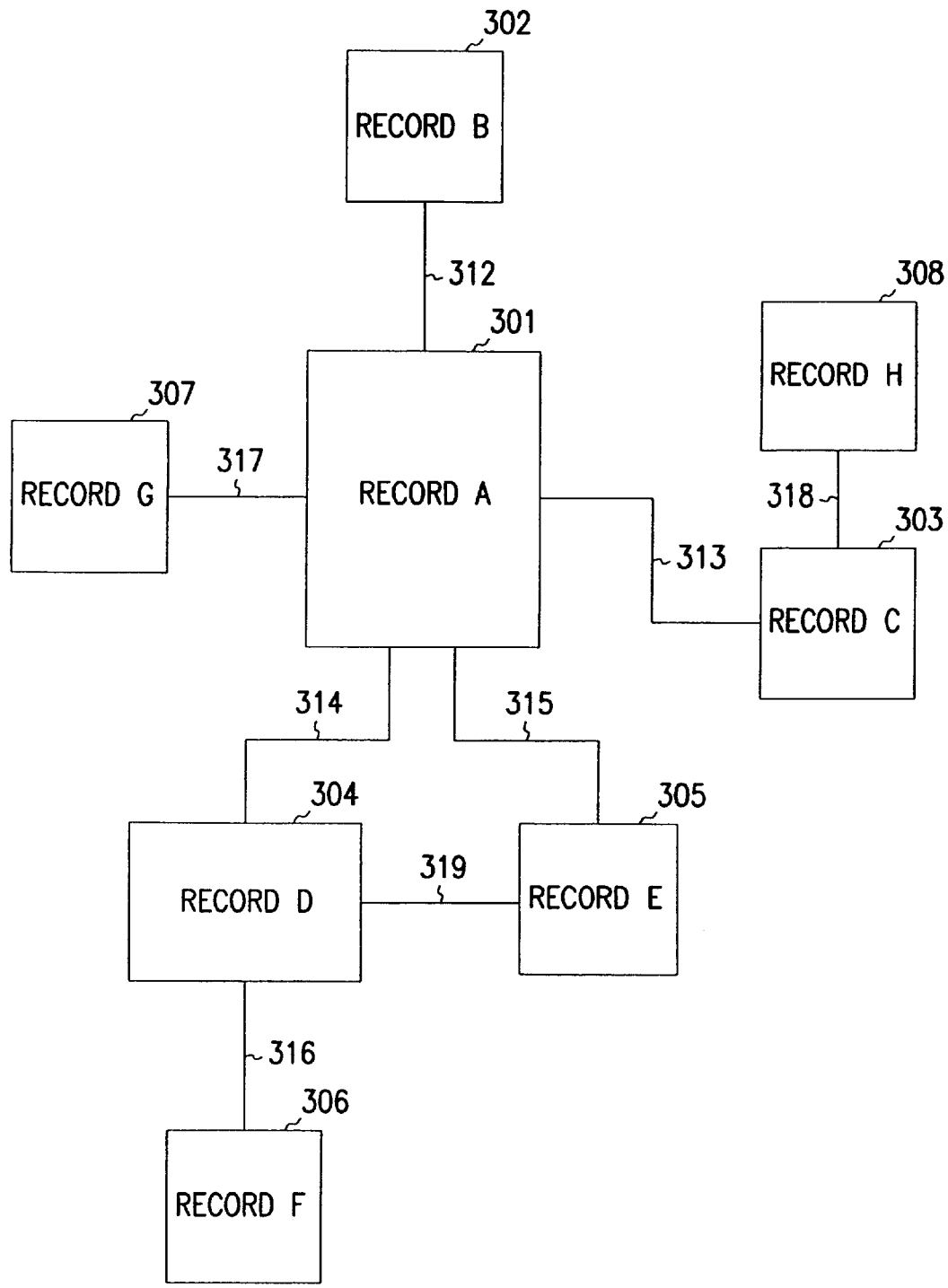

The rectilinear layout system 200 now has sufficient information to create the graph. Precise coordinates on the layout surface 501 for each sub-graph 401–404 are calculated as described above in order of the sub-graph's assigned location group as shown in FIG. 7A. Plotting each sub-graph causes coordinates on the layout surface 501 to be assigned to each of the nodes in the sub-graph. Once all the sub-graphs 401-404 have been plotted onto the layout surface 501, the rectilinear layout system 200 routes connectors between the node 301 representing the focus record A and the nodes 302, 303, 304, 305 and 307 for the records B, C, D, E and G which have a relationship with record A, resulting in the graph shown in FIG. 7B.

The system level overview of the operation of an exemplary embodiment of the invention has been described in this section of the detailed description. A rectilinear layout system has been described as creating a graph by recursively iterating thorough item and relationship information, creating focus nodes and sub-graphs through multiple levels of sub-graphs, and plotting the nodes representing the items and connectors representing the relationships for each sub-graph have been laid out relative to the focus node for each sub-level, at which point absolute coordinate information for the graph is calculated. While the invention is not limited, creating graphs from any particular type of item and relationship input, for sake of clarity a simplified data base example has been described.

Methods of an Exemplary Embodiment of the Invention

In the previous section, a system level overview of the operation of an exemplary embodiment of the invention was described. In this section, the particular methods performed by a computer according to an exemplary embodiment are described by reference to a series of flowcharts. The methods to be performed by the computer constitute computer programs made up of computer-executable instructions. Describing the methods by reference to a flowchart enables one skilled in the art to develop such programs including such instructions to carry out the methods on suitable computers (the processor of the computer executing the instructions from computer-readable media).

Figure 8:
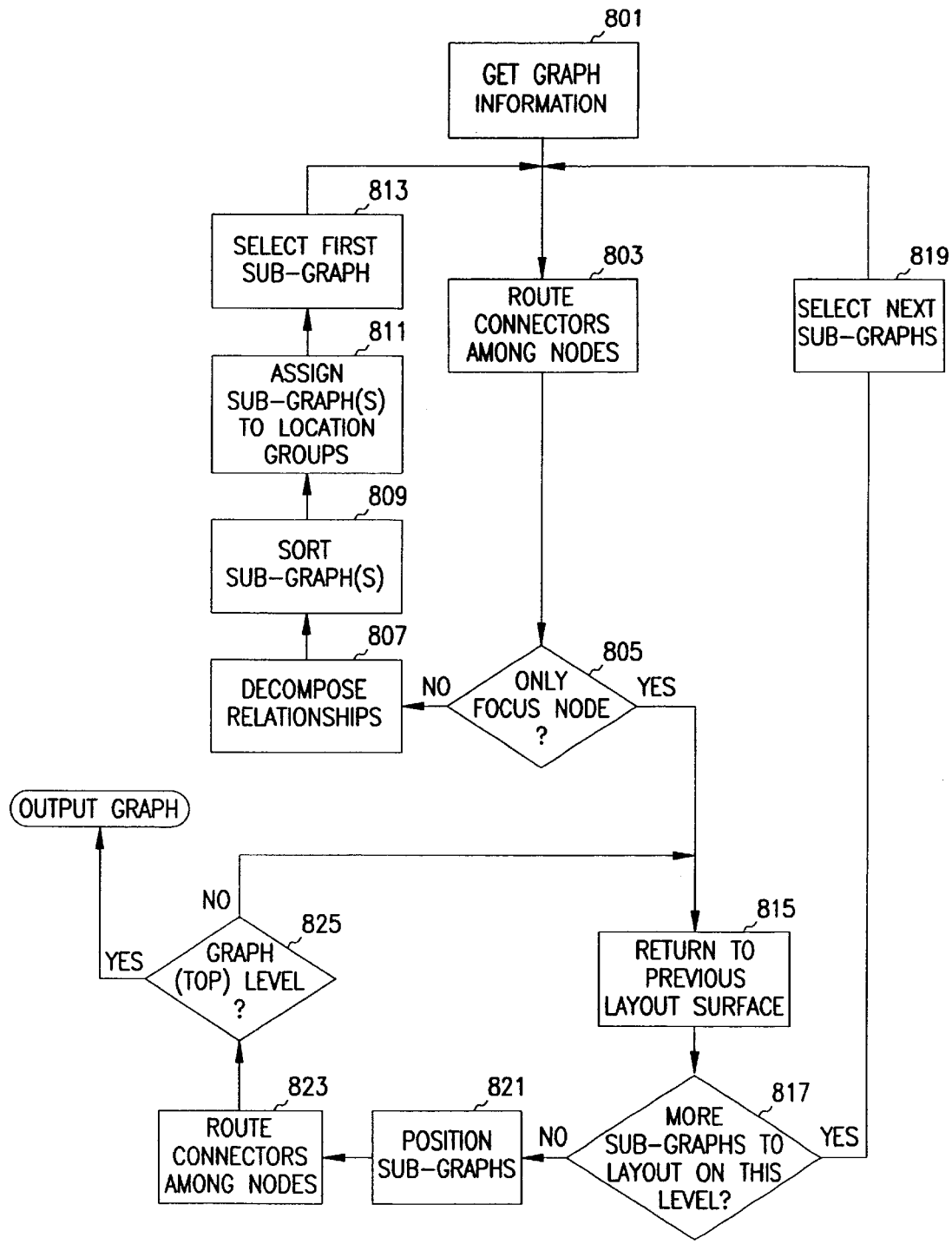
FIG. 8 is a flowchart of methods to be performed by a computer according to an exemplary embodiment of the invention.

Referring first to FIG. 8, a flowchart of a method to be performed by a computer according to an exemplary embodiment of the invention is shown. This method is inclusive of the acts required to be taken by a computer such as computer 20 or remote computer 49 in FIG. 1.

Figure 2:
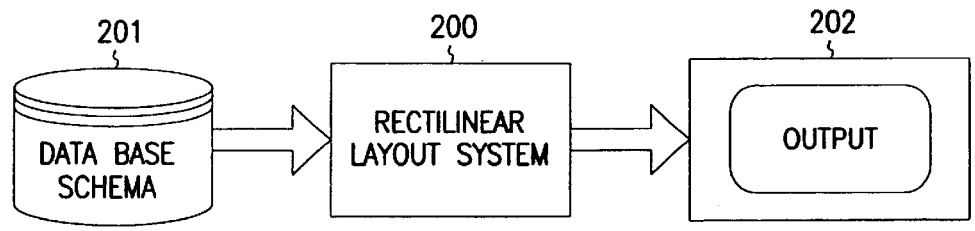
FIG. 2 is a diagram illustrating a system-level overview of an exemplary embodiment of the invention.

The rectilinear layout system acquires the information it will need to create the graph from a source such as the data base schema 201 shown in FIG. 2 (block 801). The rectilinear layout system determines the focus node for the graph and positions the focus node on the layout surface for the graph (block 803). As described in the previous section, the focus node represents the item having the maximum number of connections. In situations where two or more items have the same, maximum number of connections, the largest node is designated the focus node. Additional criteria can also be employed to determine the focus node in case of ties between items. In particular, the exemplary embodiment encompasses preference given to certain nodal shapes and certain semantics regarding the underlying item. The criteria can be defined globally for all graphs or for each individual graph. One of skill in the art will immediately perceive of other tie-breaking criteria which is applicable for use in the rectilinear layout system and such additional criteria is considered within the scope of invention.

Once the focus node for the graph (i.e., the top level) has been determined, the rectilinear layout system decomposes the relationships among the items to create sub-graphs (block 807). In the exemplary embodiment, the resulting sub-graphs are sorted in size order (block 809) and then assigned to a location group on the layout surface for the graph (block 811).

At block 811, all valid location groups for the sub-graphs are found. A valid location group for the sub-graph is a group that does not cause potential overlay between nodes and connector routes. For example, suppose a sub-graph is already located at bottom group in a previous decomposition and it has a connector to a previous focus node from its top edge in its layout. Valid location groups for the sub-graph should include left, right, and top groups in the current decomposition. The bottom group is not valid because the connector would be potentially covered by the current focus node. A more detailed explanation is provided in the continuing example.

After valid location groups are calculated for all sub-graphs, block 811 chooses which valid location group should be used for each sub-graph. The choice is based a specified layout style that determines the order in which the eight location groups are processed.

For example, when the rectilinear layout system first processes the bottom and then the top location group, the resulting graph will be oriented vertically. Processing the two sides before the top and bottom location groups results in a horizontal orientation. For a compact layout, the sub-graphs are positioned in the location groups around the four edges (sides) of a rectangular focus node. For a hierarchical layout, the sub-graphs are positioned to one side of the focus node. A balanced layout positions the sub-graphs around the focus node so that the resulting graph or sub-graph is most equally balanced vertically and horizontally. The user of the rectilinear layout system can also specify a width/height ratio which is used to determine the position of the sub-graphs on the layout surface. Other processing sequences and the resulting orientations will be readily apparent to one of skill in the art.

After the sub-graphs are assigned to location groups at block 811, the rectilinear layout system takes the first sub-graph in sorted order (block 813), determines its focus node (block 803), and determines if there are any other nodes in the sub-graph (block 805). If so, the rectilinear layout system decomposes the relationships in the current sub-graph to create lower level sub-graphs (block 807), sorts the sub-graphs (block 809) and assigns them to location groups (block 811). The rectilinear layout system recursively creates a layout surface for each of the lower level sub-graphs (looping through blocks 813 and 819). When the rectilinear layout system determines that a sub-graph contains only a focus node (block 805), the current layout surface is complete, the dimensions of the sub-graph are known, and the rectilinear layout system returns to the immediately higher layout surface (block 815).

Once all sub-graphs in the current layout surface have been laid out (block 817), the rectilinear layout system positions the focus node in the center of the current layout surface and precisely positions the sub-graphs around it (block 821). Plotting the nodes on the current layout surface determines the dimensions for the corresponding graph or sub-graph. The rectilinear layout system routes connectors between the focus node and the appropriate nodes in the sub-graphs so that no connectors cross another connector or a node (block 823). In the exemplary embodiment, the "attach" points on the edges of a node are input to the rectilinear layout system as part of the information at block

801. The attach point closest to the center of an edge is used first. The connectors are built from up to three horizontal and vertical segments as necessary, hence the name "rectilinear."

If the current layout surface corresponds to the graph, i.e., it is the top level layout surface (block 825), the rectilinear layout is complete. If the current layout surface corresponds to a sub-graph, the rectilinear layout system returns to the immediately higher layout surface (block 815) and continues creating layout surfaces until the top level layout surface is completed at block 825.

In an alternate embodiment, the rectilinear layout system only plots positions for the nodes in the sub-graphs (skipping block 823). Once all nodes have been positioned on the layout surface for the graph (block 825), the rectilinear layout system routes the connectors among the nodes (block 823).

The particular methods performed by a computer executing an exemplary embodiment of the invention have been described. The method performed by the computer has been shown by reference to a flowchart including all the blocks from 801 until 825.

Microsoft Database Designer Implementation

Figure 9:
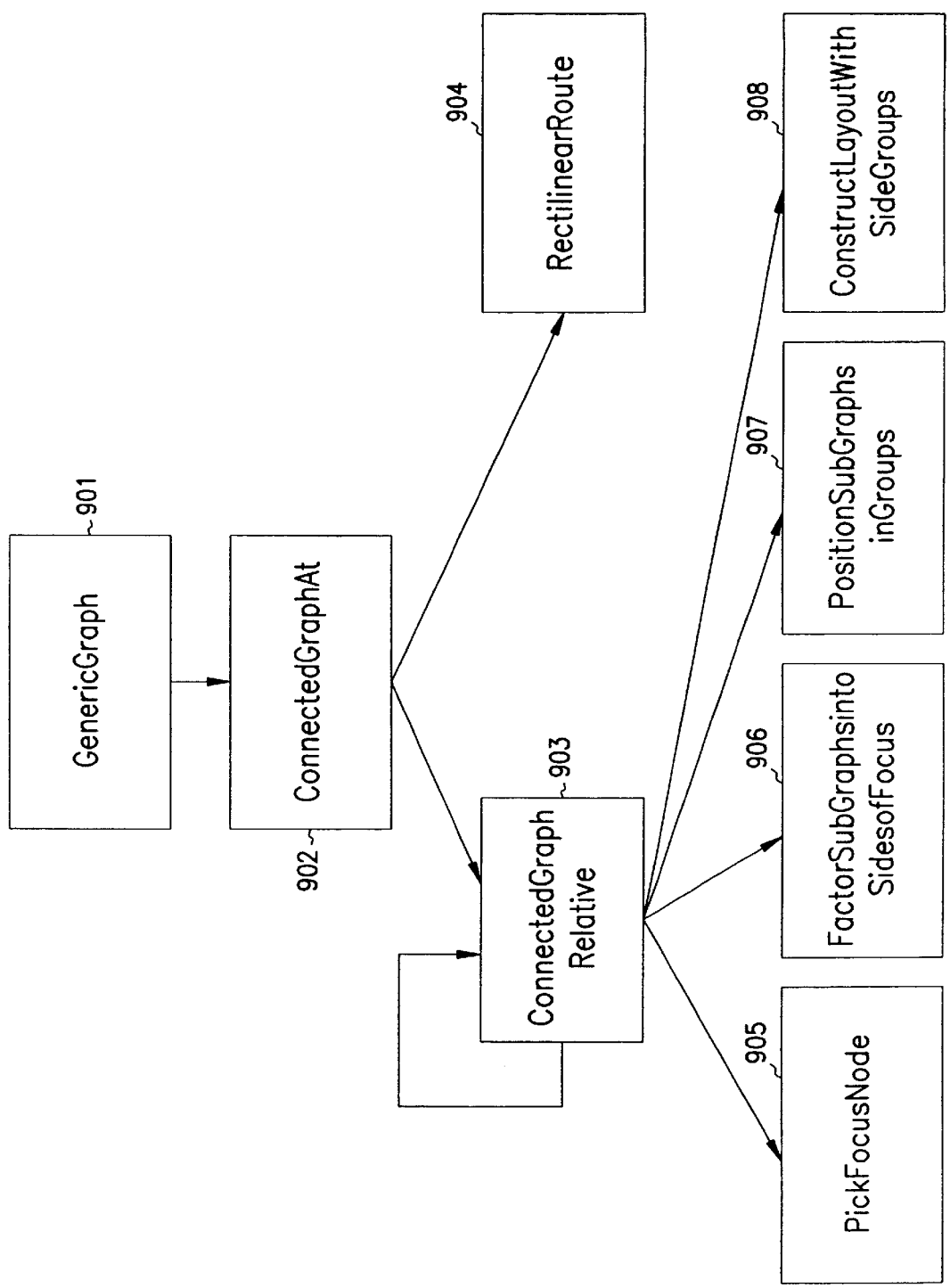
FIG. 9 is diagram illustrating modules used by a particular exemplary implementation of the invention.

In this section of the detailed description, a particular implementation of the rectilinear layout system is described that is used in Microsoft's Database Designer product. This particular implementation of the rectilinear layout system comprises eight modules as shown in FIG. 9: a GenericGraph module 901, a ConnectedGraphAt module 902, a ConnectedGraphRelative module 903, a RectilinearRoute module 904, a PickFocusNode module 905, a FactorSubGraphsIntoSidesOfFocus module 906, a PositionSubGraphsInGroups module 907, and a ConstructLayoutWithSideGroups module 908. The inputs and outputs of each module are next described in conjunction with pseudo-code that details the functioning of the modules. The Database Designer implementation partitions the graph into a series of sub-graphs, positions each node in each one of the sub-graphs through recursive processing, and then routes connectors among the nodes once the nodes are precisely located on the layout surface for the sub-graph (top level).

The Database Designer implementation uses a GenericGraph data structure to maintain the information about the nodes and the relationships for the graph. When the graph is partitioned into sub-graphs, a ConnectedGraph data structure is created for each sub-graph. The invention also creates a location group data structure for each location group on a layout surface, and a space map data structure for the layout surface associated with each sub-graph and each location group. The data structures are described in more detail below.

GenericGraph Module

Figure 10:
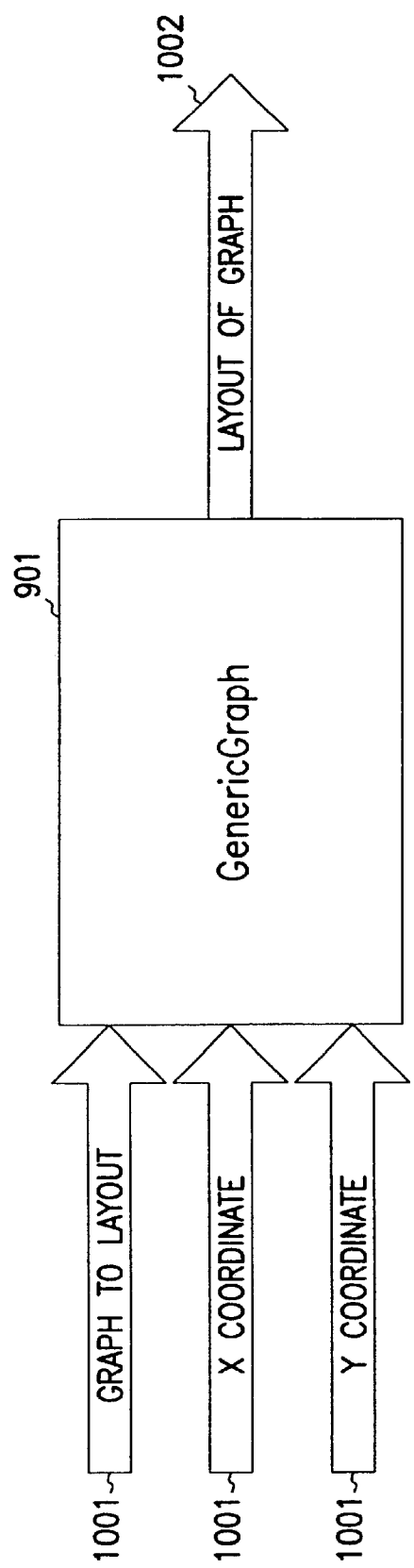
FIG. 10 is a diagram illustrating data flow through one of the modules of FIG. 9.

The GenericGraph module 901 is the top-level module for laying out a graph. It has three inputs: the GenericGraph data structure that defines the node and connector information for the graph, and a pair of X-Y coordinates (integer type) that defines the location of the resulting graph. The module 901 calculates an X-Y position for each node and connector, and stores the X-Y coordinate in the appropriate entry in the data structure. Once X-Y coordinates have been stored for all nodes and connectors in the data structure, the GenericGraph data structure is output. An overall conceptual diagram of the GenericGraph module 901 with inputs 1001 and output 1002 is shown in FIG. 10

Inputs:

X=X coordinate for the resulting layout

Y=Y coordinate for the resulting layout

GenericGraph=a data structure defining the information for the graph

Output:

GenericGraph=the data structure with coordinates assigned to every node and connector in the graph Begin 1. Partition the input data structure GenericGraph into several disconnected sub-graph data structures: $SubGraph_1, \ldots SubGraph_i, \ldots, SubGraph_n$. Each sub-graph is a "connected graph" in that all nodes are connected but the partitioning "breaks" connectors between the sub-graphs.
2. For each $SubGraph_i$ (1<=i<=n) do the following
   2.1 Call ConnectedGraphAt(X, Y, $SubGrap_i$, GraphWidth, GraphHeight) to layout $SubGraph_i$ at the X and Y coordinates specified as the first two input parameters. Graph Width and GraphHeight are the width and height of the layout returned by the ConnectedGraphAt module 902.
   2.2 Calculate X and Y for the next sub-graph using the current values of X and Y, and the returned values for GraphWidth, GraphHeight.

End

ConnectedGraphAt Module

The ConnectedGraphAt module 902 lays out a connected sub-graph at a location specified by X and Y input coordinates. The module 902 is called from the GenericGraph module 901 and returns the width and the height of the layout. It calls the ConnectedGraphRelative module 903 and the RectilinearRoute module 904 to do node placement and connector routing.

Input:

X=X coordinate for the resulting layout

Y=Y coordinate for the resulting layout

ConnectedGraph=data structure for the sub-graph

Output:

ConnectedGraph=the data structure with coordinates for all nodes and connectors

GraphWidth width of the layout

GraphHeight=height of the layout

Begin

1. Call ConnectedGraphRelative(ConnectedGraph) to place all nodes in the connected sub-graph denoted by input ConnectedGraph. The resulting coordinates for nodes are all relative to their focus nodes.
2. Convert relative coordinates of each node to absolute and physical coordinates based on the X and Y inputs.
3. Calculate the width and height of the layout for outputs GraphWidth and GraphHeight.
4. Call RectilinearRoute(ConnectedGraph) to route connectors between the nodes.

End

ConnectedGraphRelative Module

The ConnectedGraphRelative module 903 is initiated from the ConnectedGraphAt module 902 to place all nodes in the input connected sub-graph in a relative coordinate system having the focus node as its base reference. The module 903 is a recursive function that calls itself for each of the sub-graphs defined in the input data structure.

Input:
ConnectedGraph=a data structure with entries for all nodes in a sub-graph
Output:
ConnectedGraph=the data structure with relative coordinates for all the nodes in the sub-graph
Begin 1. If there is no node in input ConnectedGraph, then there is nothing to layout and the module 903 returns to the caller. This serves as a termination condition for the recursive function of the module 903.
2. If there is only one node in input ConnectedGraph, then that node is designated as the focus node and the module 902 locates it at location <0,0> in the layout surface. The module 902 then returns to the caller. This is another termination condition for the recursive function.
3. Call PickFocusNode(ConnectedGraph) to select a focus node for the input connected sub-graph. It uses several heuristics to determine a focus node. The PickFocusNode module 905 designates the focus node in ConnectedGraph as described further below.
4. Partition the input data structure ConnectedGraph into several sub-graph data structures, $SubGraph_1, \ldots, SubGraph_i, \ldots SubGrap_n$, in such a way that all sub-graphs are connected sub-graphs, there are no connectors between the sub-graphs, and there is at least one connector between each sub-graph and the focus node.
5. Call FactorSubGraphsIntoSidesOfFocus (ConnectedGraph, $SubGraph_1, \ldots, SubGraph_i, \ldots SubGraph_n$) to calculate an approximate location for each sub-graph relative to the focus node. The FactorSubGraphsIntoSidesOfFocus module 906 is described further below. After this block, every sub-graph has been put into one of the eight location groups LeftGroup, RightGroup, TopGroup, BottomGroup, LeftTopGroup, LeftBottomGroup, RightTopGroup, and RightBottomGroup. Each of these groups is associated with all sub-graphs assigned to one side of the focus node. The associations between the groups and the sub-graphs are stored in ConnectedGraph for use later by the ConnectedGraphRelative module 903.
6. For every $SubGrap_i$ (1<=I<=n), recursively call the ConnectedGraphRelative module 903 to layout the $SubGraph_i$, After this block, all sub-graphs have been laid out and each of the sub-graphs has been assigned an approximate location relative to the focus node (refer to block 5 immediately above).
7. Call PositionSubGraphsInGroups(ConnectedGraph) to plot all nodes in each of the eight locations groups independent of the other location groups. The PositionSubGraphsInGroups module 907 is described further below. After this block, all the eight groups have been laid out so that all nodes in each of the groups have been positioned.
8. Call ConstructLayoutWithSideGroups (ConnectedGraph) to put plot all eight groups around the focus node to form a complete layout. The ConstructLayoutWithSideGroups module 908 and the heuristics it uses to determine the layout style are described below.
9. At this point, all nodes have been plotted at relative locations and the ConnectedGraphRelative module 903 returns to the ConnectedGraphAt module 902.

End

RectilinearRoute Module

The RectilinearRoute module 904 is called from the ConnectedGraphAt module 902 to route all connectors in the input connected sub-graph. The input connected sub-graph is already laid out with all nodes positioned. The RectilinearRoute module 904 is a recursive procedure.

Input:
ConnectedGraph=a connected sub-graph to route
Output:
ConnectedGraph=all node paths are stored with connectors
Begin 1. If the input ConnectedGraph has only one node or no nodes at all, return to the caller, and the procedure is complete. This is the termination condition for the recursion.
2. Get the focus node for ConnectedGraph. This focus node is called FocusNode.
3. Get sub-graph groups of ConnectedGraph, $G_1, \ldots, G_i, \ldots,$ and $G_n$. Each of the groups has been positioned in previous blocks around focus node FocusNode.
4. For each of groups $G_1, \ldots, G_i, \ldots, G_n$, do the following
   4.1 Get the list of sub-graphs in the group, $S_1, \ldots, S_i, \ldots, S_m$.
   4.2 For each of the sub-graphs, recursively call the RectilinearRoute module 904 to route this sub-graph, i.e., RectilinearRoute($S_i$).
   4.3 At this point, all sub-graphs in the group have been routed. The procedure can now route connectors between the focus node FocusNode and the group.
      4.3.1 Determine where the group is located relative to FocusNode, which can be left, right, top, bottom, top-left, top-right, left-bottom, or right-bottom of FocusNode.
      4.3.2 Based on its relative location, create either a single segment or a three segment connector path for each of the connectors between FocusNode and the group.

End

PickFocusNode Module

The PickFocusNode module 905 is called from the ConnectedGraphRelative module 903 to pick a focus node for the input connected sub-graph based on a globally specified parameter ListOfHeuristics. ListOfHeuristics defines the heuristics used to determine the focus node. ListOffleuristics contains a sorted list of parameters, Focus-Node-Heuristics, in which the value of the parameter determines the heuristic to be used:

The node having the most connectors connected to it.

The node having the biggest area.

The node having a certain shape (for example, represented as certain icons).

The node having certain semantics (for example, its name contains certain sub-strings).

The node having other distinct syntactic elements.

In one embodiment of the Database Designer implementation, only the "most-connectors" and "biggest-area" heuristics are used, with the most-connectors heuristic ordered first.

The PickFocusNode module 905 takes the first value from ListOfHeuristics, and applies it to input ConnectedGraph. If more than one node qualifies as the focus node, the module 905 takes the second value from ListOfHeuristics and applies it to the potential focus nodes determined by the previous block. The module 905 iterates the two blocks moving in sorted order through the values in the ListOf- Heuristics until finds a single focus node. If all the available heuristics are used and more than one node is a potential focus node, a random choice is made.

Input:
ConnectedGraph=a data structure associated with a connected sub-graph for which a focus node will be selected ListOfHeuristics=a list of heuristics for picking a focus node Output:
ConnectedGraph=the data structure with the selected focus node marked Begin
1. Set variable ListOfNodesToExam to all nodes in input ConnectedGraph.
2. Starting from the first heuristic in ListOfHeuristics do the following for each heuristic:
   2.1 Apply the heuristic to ListOfNodesToExam to find a list of focus nodes.
   2.2 If only one focus node has been found, then save it to ConnectedGraph and return to the caller.
   2.3 If there is more than one focus node found, then replace ListOfNodeToExam with the list of focus nodes.
   2.4 Get next heuristic from ListOfHeuristics and loop back to block 2.1.
3. At this point, if more than one node qualifies as a focus node, then the first in ListOfNodeToExam for this case is chosen and returned to the ConnectedGraphRelative module 903.
End FactorSubGraphsIntoSidesOjFocus Module The FactorSubGraphsIntoSidesOfFocus module 906 is called from the ConnectedGraphRelative module 903 after a focus node has been selected for the input ConnectedGraph. The module 906 finds an approximate location for each of the input sub-graphs around the focus node. Valid approximate locations include the four sides (left, right, top, bottom) of the focus node and the four corners (left-top, left-bottom, right-top, and right-bottom) of the focus node, making a total of eight possible approximate locations. The module creates eight groups from the input sub-graphs and assigns each group to one of the approximate locations. The key to the assignment of sub-graphs to location groups is to avoid possible overlapping between connectors and nodes. Therefore, when the module 906 assigns a sub-graph to a location group, it ensures the assignment does not cause overlapping.

Input:
ConnectedGraph=The data structure for the current connected sub-graph with a focus node.
SubGraph$_1$, ..., SubGrap$_i$, ... SubGrap$_n$=Sub-graphs of ConnectedGraph to be assigned to locations.

Output:
ConnectedGraph=The data structure containing the approximate location of the sub-graph groups and the group assignment for SubGraph$_1$, ..., SubGraph$_i$, ... SubGraph$_n$ Begin
1. For each of the input sub-graphs, create a list of approximate locations that do not cause overlapping between nodes and connectors. These locations are called valid approximate locations, or valid locations.
2. Create eight empty sub-graph groups for the eight approximate locations around the focus node, resulting in left-group, right-group, top-group, bottom-group, left-top group, left-right group, right-top group, and right-bottom group. The eight groups are stored the input data structure ConnectedGraph.
3. For each of the input sub-graphs, assign the sub-graph to one of the sub-graph groups created in the previous block based on its valid approximate location (calculated in block 1) and one of the following heuristics.
   Compact Layout Style=positions sub-graphs around four sides of the focus node which tends to create layouts that are more compact. Hierarchical Layout Style=always positions sub-graphs on one side of the focus node which tends to create layouts more or less like hierarchies.
   Dimension-Guided Layout Style=If the user of the module specifies a desired width/height ratio of the layout, the module will position the sub-graphs around the focus node in such a way that the dimension of the resulting layout is close to that the user specified.
   Balanced Layout Style=Positions sub-graphs around the focus node in such a way that the overall graph looks better balanced around the focus node.
End PositionSubGraphsInGroups Module The PositionSubGraphsInGroups module 907 is called from the ConnectedGraphRelative module 903 to position all sub-graphs within each of the eight groups positioned around the focus node. The module 907 is called after all sub-graphs themselves have been laid out and thus dimensions of the laid out sub-graphs are known. The key for positioning sub-graphs within the groups is again to avoid overlapping between nodes and connectors.

Input:
ConnectedGraph=The data structure for the connected sub-graph to be laid out.

Output:
ConnectedGraph=The data structure containing coordinates for all sub-graphs as positioned within their groups.

Begin
1. For each of the eight groups positioned around the focus node, do the following.
   1.1 Create an empty layout surface for the group.
   1.2 For each of sub-graphs in the group, add the sub-graph into the layout surface in such a way that no sub-graphs will cover any connectors.
End ConstructLayoutWithSideGroups Module The ConstructLayoutWithSideGroups module 908 is called from the ConnectedGraphRelative module 903. All sub-graphs of the input ConnectedGraph have already been laid out within their respective groups, and all groups have already been assigned approximate locations around the focus node of the input ConnectedGraph. The module 908 actually positions the eight groups at precise locations relative to the focus node.

Input:
ConnectedGraph=the data structure for a connected sub-graph to be laid out Output:
ConnectedGraph=the data structure with all groups of sub-graphs positioned precisely Begin
1. Create an empty layout surface for the input ConnectedGraph.
2. Locate the focus node at the middle of the layout surface.

3. For each of the eight sub-graph groups, plot the group onto the layout surface based on the approximate location assigned to the group relative to the focus node and in a position on the layout surface that does not overlap any nodes or connectors already on the layout surface.

End

Data Structures

Exemplary embodiments for a GenericGraph data structure 1100, a ConnectedGraph data structure 1200, a location group data structure 1300 and a space map data structure 1400 are illustrated in FIGS. 11–14, respectively.

The GenericGraph data structure 100 contains an entry 1101 is an entry for each node in the graph. The entry 1101 comprises five fields. Field 1102 contains a node identifier for the node corresponding to the entry. Field 1103 contains the width of the node, while field 1104 contains the height. Fields 1102–1104 are input to the Database Designer implementation of the rectilinear layout system through an interface module tailored to match the requirements of the source of the information. Field 1105 contains position information for the nodes which in the Database Designer implementation is an X-Y coordinate pair. One of skill in the art will immediately perceive that the format of field 1106 depends on the coordinate system being used to plot the graph. Additionally, the X-Y coordinate pair can be chosen to be the center point of the node, a corner, or another point on the node depending on the requirements of an interface that takes the output from the Database Designer implementation. Field 1107 is an indicator which is set if the node is the focus node for the corresponding graph or sub-graph. Alternate embodiments in which the fields are arranged differently or have different formats will be readily apparent to one of skill in the art and are considered within the scope of the invention.

Entry 1121 is an entry for a relationship between two nodes and contains information about the connector that represents the relationship when the entry 1121 is output. Fields 1122 and 1123 contains the node identifiers for the related nodes. Field 1124 contains the position information for a first segment of the connector. Such information can be in many formats. For example, the information can be two pairs of X-Y coordinates, one for the starting point of the connector and one for the ending point. Alternatively, the information can be a single pair of X-Y coordinates, a length value, and an angle value that determines the orientation of the connector. Because the Database Designer implementation can plot connectors consisting of one, two, or three segments as necessary to avoid overlap, the entry 1121 can also have fields 1125 and 1126 (shown in phantom) that define a second and third segment respectively.

The output fields in the GenericGraph data structure 1100 for the graph are filled in with information as the graph is being created using the modules described above. When the graph is partitioned by the GenericGraph module 901, a ConnectedGraph data structure 1200 is created for each sub-graph (connected graph) created by the partitioning. As each sub-graph is further partitioned by the ConnectedGraphAt module 902, a ConnectedGraph data structure is also created for each of the lower level sub-graphs.

The ConnectedGraph data structure 1100 comprises five entries 1201–1205, each of which holds apointer, and three lists 1210, 1220, and 1230. Entries 1201 and 1202 contain pointers to a list of the nodes 1210 in the sub-graph and to a list of the connectors 1220 in the sub-graph associated with the ConnectedGraph data structure, respectively. Each entry 1211, 1221 in the lists 1210, 1220 of nodes connectors is a pointer to either a node entry 1101 or a connector entry 1121 in the GenericGraph data structure 1100. The appropriate lists 1210, 1220 of nodes and connectors are created when the graph and sub-graph is partitioned. Entry 1203 contains a pointer to the node entry 1101 in the GenericGraph data structure 1100 that represents the node chosen as the focus node for the sub-graph associated with the ConnectedGraph data structure 1200.

As the locations groups for the sub-graph associated with the ConnectedGraph data structure 1200 are defined by the FactorSubGraphsintoSideofFocus module 906, a location group data structure 1300 (refer to FIG. 13) is created for each location group. A list 1230 containing the pointers to the location group data structures for the sub-graph is created and a pointer to the list 1230 is stored in entry 1204 of the associated ConnectedGraph data structure 1200.

Each sub-group is plotted onto a layout surface and a space map data structure 1400 (refer to FIG. 14) is used by the FactorSubGraphsintoSideofFocus module 906 to store the parameters that define the layout surface for the sub-group. A pointer to the appropriate space map data structure 1400 is stored in entry 102 in the ConnectedGraph data structure 1200.

Because of the nested nature of the sub-graphs and location groups, and their associated layout surfaces, the corresponding ConnectedGraph, location group, and space map data structures can be conceptually visualized as similarly nested. One of skill in the art will readily appreciate that as the modules described above resolve the position coordinates and other characteristics of the various nodes and connectors in the graph, the data is stored in the corresponding entries in the GenericGraph data structure 1100 pointed to by the entries 1201–1203 in the ConnectedGraph data structure 1200. In particular, after the location group 1300, and space map 1400 data structures are created by the FactorSubGraphsIntoSidesOfFocus module 906, the data structures are used by the RectilinearRoute module 904, the PositionSubGraphsInGroups module 907, and the ConstructLayoutWithSideGroups module 908 to fill in the appropriate entries in the GenericGraph data structure 1100.

Figure 13:
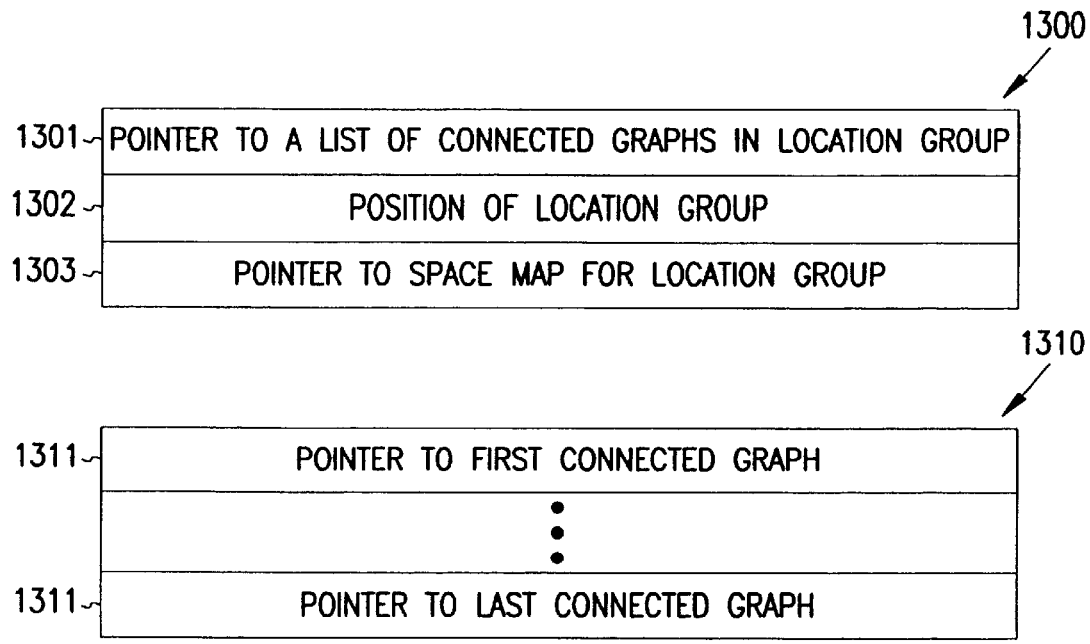
Figure 14:
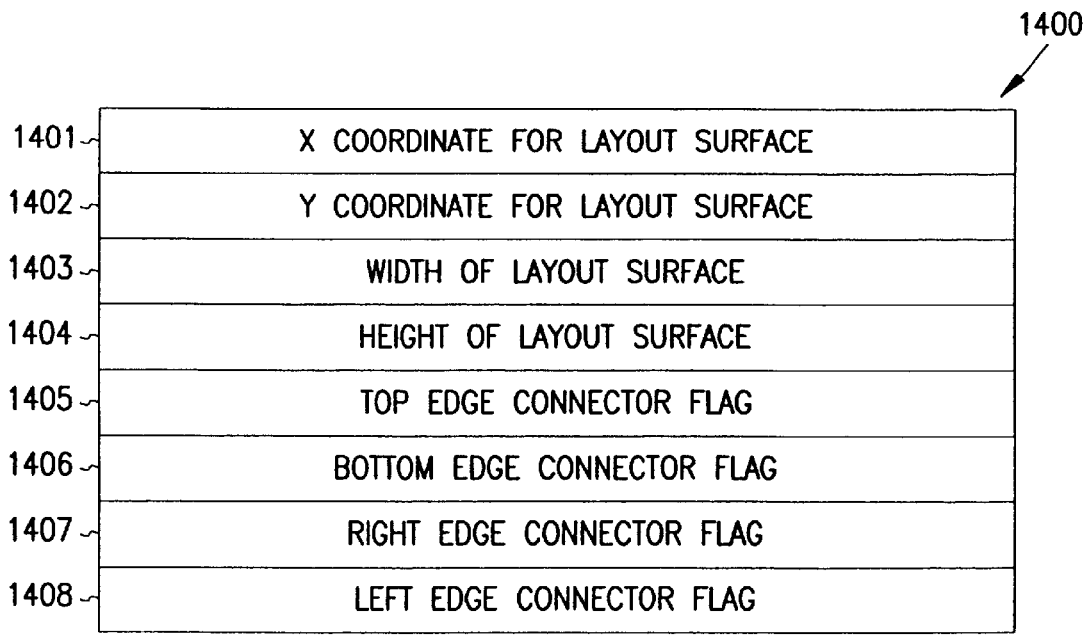

Turning now to FIG. 13, the location group data structure 1300 is described in more detail. The location data structure 1300 comprises three entries 1301–1302 and a list 1303 of pointers to the sub-graphs assigned to the location group. Entry 1301 contains a pointer to the list 1303. Entry 1302 designates a position for the location group, such as top, bottom, etc. Each location group is also associated with a layout surface and a space map data structure 1400 is used to define the layout surface for the location group. Entry 1303 contains a pointer to the appropriate space map data structure 1400 for the location group.

The space map data structure 1400 comprises eight entries 1401–1408. Entries 1401, 1402 contain the X and Y position coordinates for the associated layout surface in the final graph; entries 1403, 1403 define the size of the layout surface. Entries 1405–1408 are flags that are set when there is a connector intersecting the layout surface at the top, bottom, right, or left edge, respectively. Such connectors connect nodes mapped on the particular layout surface with nodes mapped on other layout surfaces.

In this section, a particular implementation of the rectilinear layout system for the Microsoft Database Designer system and data structures used to manage the node and connector information has been described. While various entries in the data structures are described as holding pointers, one of skill in the art will immediately perceive that other types of identifiers can be substituted for the pointers.

Furthermore, lists of pointers which are described as being part of several of the data structure can also be implemented in other structures or can be separated from the related data structure without departing from the scope of the invention.

Conclusion

A rectilinear layout system has been described which recursively iterates through information defining items and relationships among the items to produce a graph of the information without the need for costly backtracking through either the basic input information or when routing connectors that represent the relationship among nodes that represent the items. The first block of the rectilinear layout system recursively partitions the graph and all valid candidate locations for the node/sub-graph are calculated. In the second block of the rectilinear layout system, the graph is recursively constructed by calculating the actual x-y coordinates for the node/sub-graph on the valid locations. Connector routing is completely localized at each sub-graph level since there is no connection between two non-focus nodes at different sub-graph levels.

As a result, the graphs produced by the rectilinear layout system have several beneficial characteristics. A graph contains one or more clusters of nodes in which the nodes are usually grouped closer relative to each other than nodes in different clusters, thus visually indicating their close relationships and correlating the relationships with the nodes. This characteristic makes complex diagrams laid out with the rectilinear layout system much clearer. Each cluster in a graph contains one focus node with distinct syntactic or semantic features and the clusters are positioned in such a way that they can be easily located and navigated by a human being. Finally, nodes and sub-graphs within a cluster can be positioned symmetrically around the focus node which aids in the understanding of the connectivity within clusters.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all operating system environments and languages that support recursive processing. Therefore, it is manifestly intended that this invention be limited only by the following claims and equivalents thereof.

We claim:

1. A computerized method for creating an illustration of a plurality of relationships among a plurality of nodes, the relationships defined by node and connector information, the method comprising:

determining based on the node and connector information which one node of the plurality of nodes has the most neighboring relationships with the other nodes of the plurality of nodes;

setting the one node to be a highest level focus node;

separating the plurality of nodes into a plurality of subgroups, each subgroup having an associated focus node based on the relationships among the plurality of nodes; and assembling the subgroups around the highest level focus node based on contextual heuristics to provide the illustration.

2. The method of claim 1, wherein the contextual heuristics are a function of size of the nodes.

3. The method of claim 2 wherein large nodes are positioned proximate a center of the illustration.

4. The method of claim 1 wherein separating nodes into subgroups comprises recursively processing each subgroup until a subgroup contains a single node.

5. The method of claim 1 wherein assembling all subgroups comprises:

recursively plotting the nodes in the plurality of subgroups on a layout surface for the graph;

positioning the subgroups on the layout surface for the graph; and routing connectors among the nodes on the layout surface for the graph to represent the plurality of relationships among the nodes.

6. The method of claim 1 wherein the nodes are representative of database objects.

7. A computer readable medium having instructions for causing a computer to perform a method for creating an illustration of a plurality of relationships among a plurality of nodes, the relationships defined by node and connector information, the method comprising:

determining based on the node and connector information which one node of the plurality of nodes has the most neighboring relationships with the other nodes of the plurality of nodes;

setting the one node to be a highest level focus node;

separating the plurality of nodes into a plurality of subgroups, each subgroup having an associated focus node based on the relationships among the plurality of nodes; and assembling the subgroups around the highest level focus node based on contextual heuristics to provide the illustration.

8. The computer readable medium of claim 7 wherein separating nodes into subgroups comprises recursively processing each subgroup until a subgroup contains a single node.

9. The computer readable medium of claim 7 wherein assembling all subgroups comprises:

recursively plotting the nodes in the plurality of subgroups on a layout surface for the graph;

positioning the subgroups on the layout surface for the graph; and routing connectors among the nodes on the layout surface for the graph to represent the plurality of relationships among the nodes.

10. A system that creates an illustration of a plurality of relationships among a plurality of nodes, the relationships defined by node and connector information, the system comprising:

a module that determines based on the node and connector information which one node of the plurality of nodes has the most neighboring relationships with the other nodes of the plurality of nodes;

a module that sets the one node to be a highest level focus node;

a module that separates the plurality of nodes into a plurality of subgroups, each subgroup having an associated focus node based on the relationships among the plurality of nodes; and a module that assembles the subgroups around the highest level focus node based on contextual heuristics to provide the illustration.

11. A computerized method for creating a graph illustrating a plurality of relationships among a plurality of nodes, the relationships defined by node and connector information, the method comprising:

obtaining the node and connector information for the plurality of nodes and the plurality of relationships for the graph;

determining based on the node and connector information which one node of the plurality of nodes has the most neighboring relationships with the other nodes of the plurality of nodes;

setting the one node to be a highest level focus node;

recursively plotting the nodes on a layout surface for the graph;

positioning the plurality of nodes on the layout surface for the graph relative to the focus node; and routing a plurality of connectors among the plurality of nodes on the layout surface for the graph to represent the plurality of relationships among the plurality of nodes.

12. The method of claim 11, wherein recursively plotting the nodes comprises:

recursively processing a plurality of sub-graphs through sequentially lower levels of sub-graphs until all lower level sub-graphs for each higher level sub-graph have been processed; and routing connectors among the nodes on the layout surface for each higher level sub-graph when all the lower level sub-graphs for the higher level sub-graph have been processed.

13. The method of claim 12, wherein recursively processing the sub-graphs comprises:

recursively processing each lower level sub-graph until a current lower level sub-graph contains a single node; and plotting the single node onto a layout surface for the current lower level sub-graph.

14. The method of claim 13, wherein recursively processing each lower level sub-graph comprises:

designating a focus node for the current lower level sub-graph;

creating at least one subset relationship defining a next lower level sub-graph; and assigning the at least one next lower level sub-graph to a location group relative to the focus node for the current lower level sub-graph.

15. The method of claim 13, wherein the assignment of sub-graphs to location groups is based on potential connector routes between the nodes in the graph.

16. The method of claim 13, wherein the actions are executed in the order recited.

17. The method of claim 13, wherein a node having the most relationships is designated as the focus node.

18. The method of claim 14, wherein when a plurality of nodes have the same number of relationships, a node having the biggest size is designated as the focus node.

19. The method of claim 14, wherein the assignment of the at least one lower-level sub-graph to a location groups is directed by a style heuristic for the graph.

20. The method of claim 14, wherein the assignment of a sub-graphs to location groups is directed by a style heuristic for the graph.

21. The method of claim 20, wherein the style heuristic is selected from the group consisting of a compact layout style heuristic, a hierarchical layout style heuristic, a dimension-guided layout style heuristic, and a balanced layout style heuristic.

22. A computerized method for creating a graph illustrating a plurality of relationships among a plurality of nodes, the relationships defined by node and connector information, the method comprising:

determining based on the node and connector information which one node of the plurality of nodes has the most neighboring relationships with the other nodes of the plurality of nodes;

setting the one node to be a highest level focus node;

creating a plurality of hierarchical sub-graphs from the remaining nodes;

organizing the sub-graphs relative to the focus node based on contextual heuristics.

23. A computer-readable medium having stored thereon a graph data structure illustrating a plurality of relationships among a plurality of nodes comprising:

a first entry comprising;
an identification of a first node;
an attribute of the first node;
a position for the first node;
an indication if the first node is a focus node having the most neighboring relationships with other nodes in the plurality of nodes;

a second entry comprising:
an identification of a second node;
an attribute of the second node;
a position for the second node;
an identification if the second node is a focus node having the most neighboring relationships with other nodes in the plurality of nodes;

a third entry comprising:
an identification of the first and second nodes; and
a definition of a first connector segment representing a relationship between the first node and the second node.

24. The computer-readable medium of claim 23, wherein the third entry further comprises data defining a position for a second connector segment, and the first and second connector segments combined represent the relationship between the first node and the second node.

25. The computer-readable medium of claim 24, wherein the third entry further comprises data defining a position for a third connector segment, and the first, second and third connector segments combined represent the relationship between the first node and the second node.

26. A computer-readable medium having stored thereon a space map data structure illustrating a plurality of relationships among a plurality of nodes comprising:

a first field containing data representing a layout structure with a central focus node having the most neighboring relationships with other nodes in the plurality of nodes;

a second field containing data representing dimensions of the layout structure to be plotted;

a third field containing data representing connector intersections with a boundary of the layout structure, wherein the boundary is defined by the second field.

27. The computer-readable medium of claim 26, wherein the first field comprises X and Y coordinates in a Cartesian coordinate system.

28. A computer-readable medium having stored thereon a space map data structure illustrating a plurality of relationships among a plurality of nodes comprising:

a first field containing data representing coordinates for a layout structure with a central focus node having the most neighboring relationships with other nodes in the plurality of nodes;

a second field containing data representing dimensions of the layout structure to be plotted at the coordinates identified by the first field;

a third field containing data representing connector intersections with a boundary of the layout surface, wherein the boundary is defined by the second field.

29. The computer-readable medium of claim 28, wherein the first field comprises X and Y coordinates in a Cartesian coordinate system.

30. The computer-readable medium of claim 29, wherein the second field comprises width and height measurements.

31. A computer readable medium having stored thereon a graph data structure illustrating a plurality of relationships among a plurality of nodes, the graph data structure comprising:

a first entry corresponding to a central focus node of the graph, the first entry representing a first node of the plurality of nodes that has the most neighboring nodes; and a plurality of subgroups of entries each corresponding to a subgroup of nodes of the graph surrounding the central focus node;

wherein each subgroup of entries comprises a second entry corresponding to a central focus node of the subgroup of nodes, the second entry representing one node of the subgroup of nodes that has the most neighboring nodes.

32. The computer readable medium of claim 31, wherein each subgroup of entries comprises a plurality of recursive subgroups of entries each corresponding to a recursive subgroup of nodes of the graph, wherein each recursive subgroup comprises a recursive second entry corresponding to a central focus node of the recursive subgroup, the recursive second entry representing one node of the recursive subgroup of nodes that has the most neighboring nodes.

* * * * *

UNITED STATES PATENT AND TRADEMARK OFFICE
CERTIFICATE OF CORRECTION

| | | |
|---|---|---|
| PATENT NO. | : 6,801,200 B1 | Page 1 of 2 |
| APPLICATION NO. | : 09/717644 | |
| DATED | : October 5, 2004 | |
| INVENTOR(S) | : Prakriya et al. | |

Figure 11:
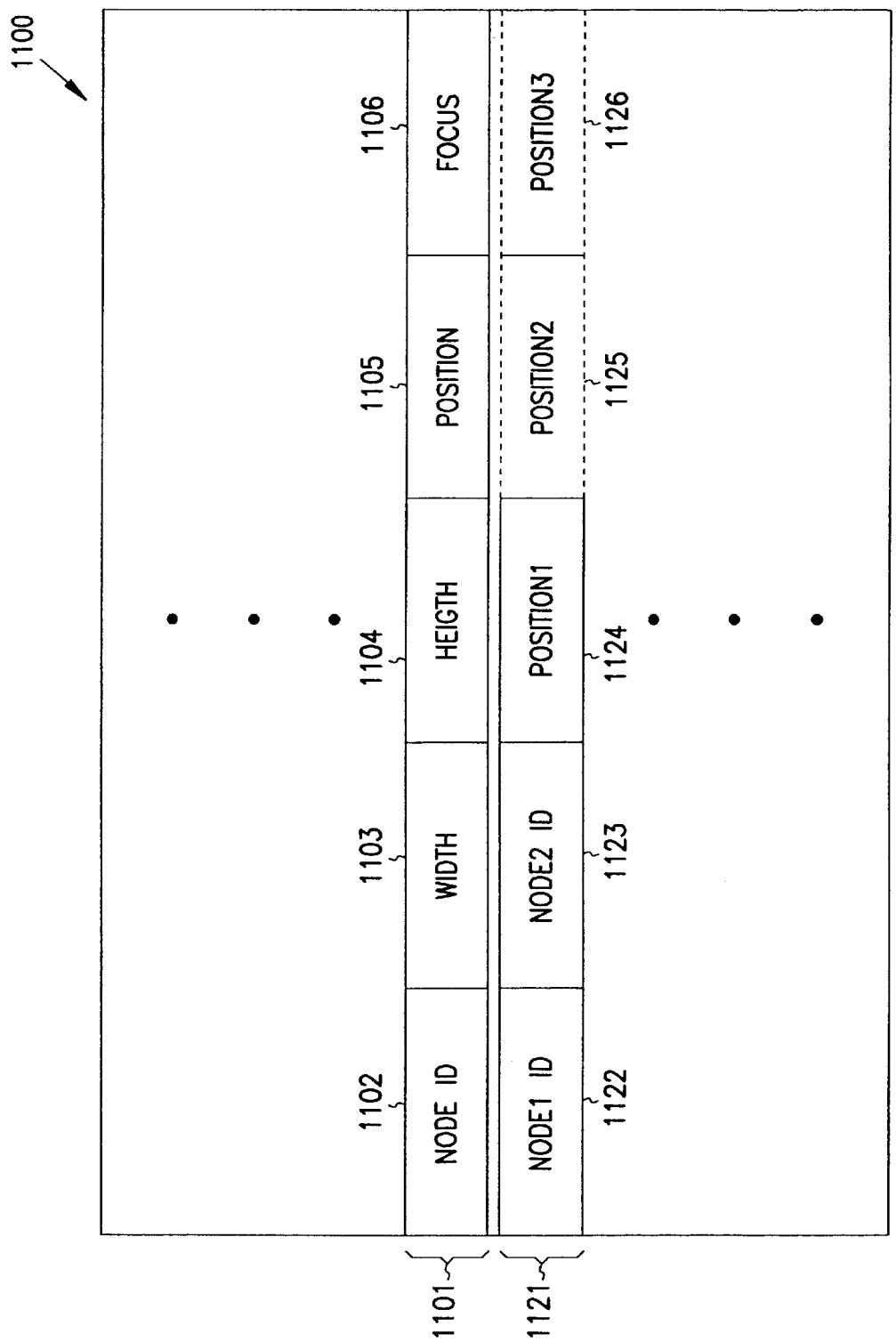
FIGS. 11, 12, 13, and 14 are diagrams of exemplary data structures used in conjunction with the implementation of FIG. 9.
Figure 12:
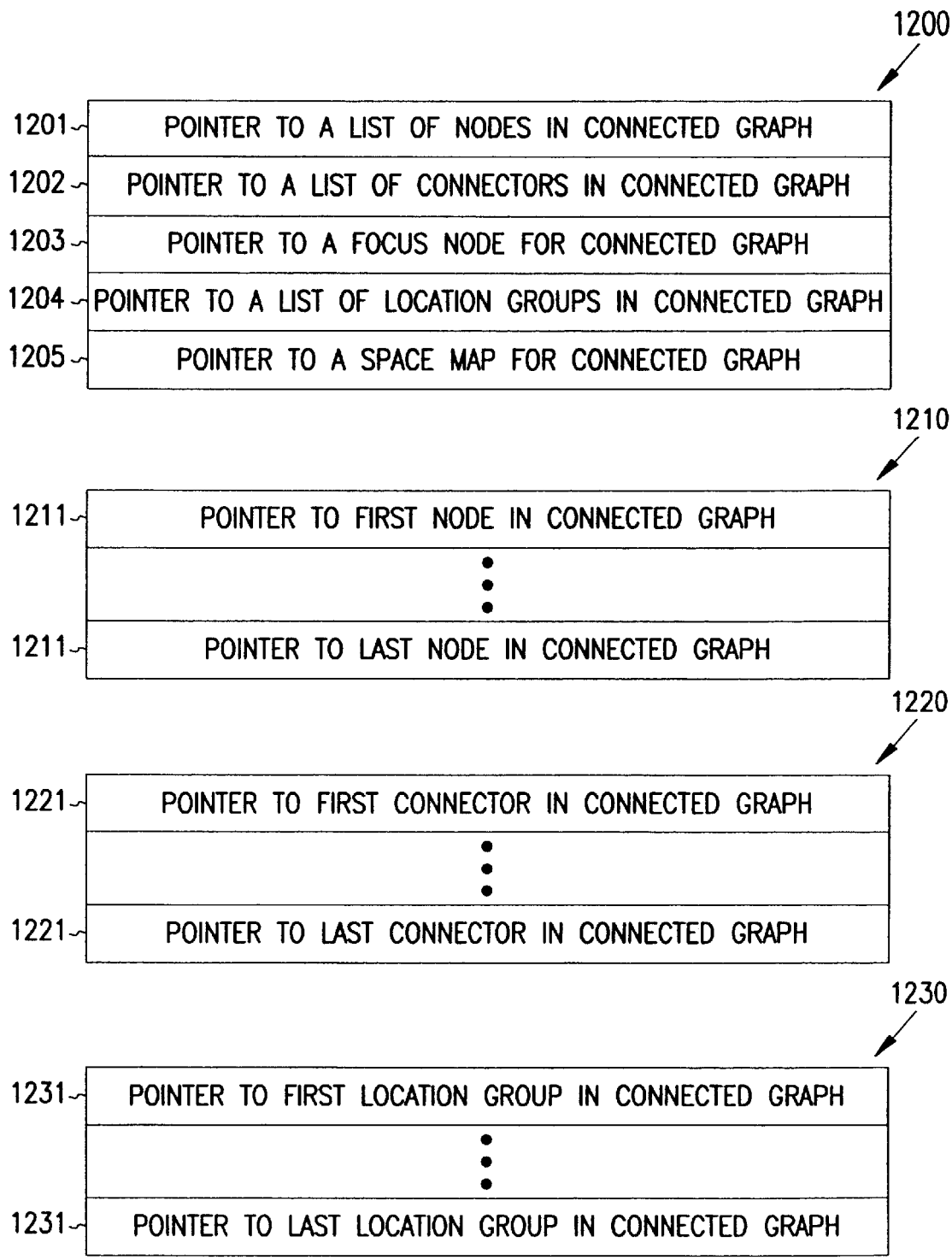

It is certified that error appears in the above-identified patent and that said Letters Patent is hereby corrected as shown below:

On Sheet 12 of 14, in FIG. 11 (Box 1104), line 1, delete "HEIGTH" and insert -- HEIGHT --, therefor.

In column 1, line 47, delete "Vision®" and insert -- Visio® --, therefor.

In column 4, line 56, after "computer" insert -- 20 --.

In column 6, line 61, delete "sub-graph Sub-graph" insert -- sub-graph. Sub-graph --, therefor.

In column 7, line 9, delete "501" and insert -- 502 --, therefor.

In column 7, line 11, delete "502" and insert -- 505 --, therefor.

In column 11, line 67, after "FIG. 10" insert -- . --.

In column 12, line 1, delete "Inputs:" and insert -- Input: --, therefor.

In column 12, line 18, after "following" insert -- : --.

In column 12, line 19, delete "SubGrap$_i$," and insert -- SubGraph$_i$, --, therefor.

In column 12, line 22, delete "Graph Width" and insert -- GraphWidth --, therefor.

In column 12, line 46, delete "GraphWidth width" and insert -- GraphWidth=width --, therefor.

In column 14, line 23, after "following" insert -- : --.

In column 14, line 46, delete "ListOffleuristics" and insert -- ListOfHeuristics --, therefor.

In column 15, line 16, delete "ListOffleuristics" and insert -- ListOfHeuristics --, therefor.

In column 15, line 32, delete "FactorSubGraphsIntoSidesOjFocus" and insert -- FactorSubGraphsIntoSidesOfFocus --, therefor.

UNITED STATES PATENT AND TRADEMARK OFFICE
CERTIFICATE OF CORRECTION

PATENT NO. : 6,801,200 B1
APPLICATION NO. : 09/717644
DATED : October 5, 2004
INVENTOR(S) : Prakriya et al.

It is certified that error appears in the above-identified patent and that said Letters Patent is hereby corrected as shown below:

In column 15, line 52, delete "$SubGrap_i$," and insert -- $SubGraph_i$, --, therefor.

In column 15, line 52, delete "$SubGrap_n$," and insert -- $SubGraph_n$, --, therefor.

In column 16, line 42, after "following" delete "." and insert -- : --, therefor.

In column 17, line 61, delete "apointer" and insert -- a pointer --, therefor.

In column 18, line 10, delete "FactorSubGraphsintoSideofFocus" and insert -- FactorSubGraphsIntoSideofFocus --, therefor.

In column 18, line 18, delete "FactorSubGraphsintoSideofFocus" and insert -- FactorSubGraphsIntoSideofFocus --, therefor.

In column 19, line 66, in Claim 2, delete "claim 1," and insert -- claim 1 --, therefor.

In column 21, line 60, in Claim 20, after "of" delete "a".

Signed and Sealed this

Seventh Day of April, 2009

JOHN DOLL
*Acting Director of the United States Patent and Trademark Office*